United States Patent
Ashraf

(10) Patent No.: US 11,618,007 B2
(45) Date of Patent: *Apr. 4, 2023

(54) METHOD FOR SULFONATING AND OXIDIZING SAWDUST TO FORM A SORBENT

(71) Applicant: Prince Mohammad Bin Fahd University, Dhahran (SA)

(72) Inventor: Muhammad Waqar Ashraf, Dhahran (SA)

(73) Assignee: Prince Mohammad Bin Fahd University, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 17/960,841

(22) Filed: Oct. 6, 2022

(65) Prior Publication Data
US 2023/0041993 A1    Feb. 9, 2023

Related U.S. Application Data

(63) Continuation of application No. 16/737,554, filed on Jan. 8, 2020, now Pat. No. 11,471,858.

(51) Int. Cl.
*B01J 20/30* (2006.01)
*B01J 20/28* (2006.01)
*C02F 1/28* (2023.01)
*C02F 1/58* (2023.01)
*B01J 20/32* (2006.01)
*B01J 20/24* (2006.01)
*B01J 20/22* (2006.01)
*B27L 11/06* (2006.01)

(52) U.S. Cl.
CPC ..... *B01J 20/3078* (2013.01); *B01J 20/28016* (2013.01); *B01J 20/28059* (2013.01); *B01J 20/3021* (2013.01); *B01J 20/3071* (2013.01); *B01J 20/3231* (2013.01); *B01J 20/3242* (2013.01); *B01J 20/3248* (2013.01); *C02F 1/288* (2013.01); *C02F 1/58* (2013.01); *B01J 20/22* (2013.01); *B01J 20/24* (2013.01); *B01J 20/305* (2013.01); *B27L 11/06* (2013.01)

(58) Field of Classification Search
CPC .. B01J 20/30; B01J 20/3078; B01J 20/28016; B01J 20/28059; B01J 20/3021; B01J 20/3071; B01J 20/3231; B01J 20/3242; B01J 20/3248; B01J 20/22; B01J 20/24; B01J 20/305; C02F 1/288; C02F 1/58; B27L 11/06
USPC .......................................................... 502/401
See application file for complete search history.

(56) References Cited

U.S. PATENT DOCUMENTS 3,575,884 A    4/1971  Seiler
10,913,050 B1 * 2/2021  Ashraf ............... B01J 20/28016

FOREIGN PATENT DOCUMENTS

CN    103566905 B    8/2015
CN    105561938 A    5/2016

OTHER PUBLICATIONS

Muhammad Waqar ASHRAF, et al., "Adsorption Studies of Textile Dye (Chrysoidine) from Aqueous Solutions Using Activated Sawdust", International Journal of Chemical Engineering, Article ID: 9728156, 2019, 8 pages.
V.K. Garg, et al., "Dye removal from aqueous solution by adsorption on treated sawdust", Bioresource Technology, vol. 89, Issue 2, Sep. 2003, pp. 121-124.
Alok Mittal, et al., "Removal and recovery of Chrysoidine Y from aqueous solutions by waste materials", Journal of Colloid and Interface Science, vol. 344, Issue 2, Apr. 15, 2010, pp. 497-507 (Abstract only).
Shiv Pratap Raghuvanshi, et al., "Removal of textile basic dye from aqueous solutions using sawdust as bio-adsorbent", International Journal of Environmental Studies, vol. 62, No. 3, Jun. 2005, pp. 329-339.

* cited by examiner

*Primary Examiner* — Edward M Johnson
(74) *Attorney, Agent, or Firm* — Oblon, McClelland, Maier & Neustadt, L.L.P.

(57) ABSTRACT

A method for producing a modified sawdust sorbent. The method involves sulfonating sawdust with sulfuric acid and oxidizing the sulfonated sawdust with hydrogen peroxide. The method yields a modified sawdust sorbent containing sulfonated and oxidized cellulose. The modified sawdust sorbent has a higher surface area, higher organic dye adsorption capacity, and more rapid organic dye adsorption rate than unmodified sawdust. A method of using the modified sawdust sorbent for organic dye removal from water is included.

10 Claims, 8 Drawing Sheets

METHOD FOR SULFONATING AND OXIDIZING SAWDUST TO FORM A SORBENT

CROSS-REFERENCE TO RELATED APPLICATIONS

The present application is a Continuation of U.S. application Ser. No. 16/737,554, now allowed, having a filing date of Jan. 8, 2020, and is related to U.S. application Ser. No. 16/990,123, now U.S. Pat. No. 10,913,050, having a filing date of Aug. 11, 2020 which is a Continuation of U.S. application Ser. No. 16/737,554.

STATEMENT REGARDING PRIOR DISCLOSURE BY THE INVENTORS

Aspects of this technology are described in an article "Adsorption Studies of Textile Dye (Chrysoidine) from Aqueous Solutions Using Activated Sawdust" published in *International Journal of Chemical Engineering*, on Mar. 13, 2019, which is incorporated herein by reference in its entirety.

BACKGROUND OF THE INVENTION

Field of the Invention

The present disclosure relates to a method of preparing a modified sawdust sorbent from sulfonated and oxidized sawdust, the modified sawdust sorbent produced by the method, and a method for the removal of an organic dye from water using the modified sawdust sorbent.

Discussion of the Background

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Wastewaters from textile industries are colored, which is mainly due to dyes used in such textile industries. Chemical species present in textile effluents are of diverse nature, and therefore pose a challenge to conventional physicochemical and biological treatment methods tailored to a specific type of contaminating chemical species. Many textile dyes are toxic and visible pollutants, so their removal from the effluent stream of textile production is ecologically essential. Recent estimates indicate that approximately 12% of synthetic dyes used each year are lost during manufacture and processing operations and that 20-35% of these dyes enter the environment through effluents from the treatment of residual industrial water. Dyes are easily visible even when highly diluted, posing aesthetic and physiochemical problems and are toxic to both human and aquatic life.

Numerous procedures, such as chemical coagulation using alum, lime, ferric chloride, and ferric sulfate, biosorption, oxidation methods using chloride and ozone, membrane separation, biological treatment, sequestration with magnetic particles, and adsorption have been employed to remove dyes from industrial effluents [M. W. Ashraf, Polish Journal of Chemical Technology, 18, 2, 26-30, 2016; K.-L. Chang, et al., New Carbon Materials, 29, 1, 47-54, 2014; T. A. Arica, E. Ayas, and M. Y. Arica, Microporous and Mesoporous Materials, 243, 1, 164-175, 2017; T. A. Arica, M. Kuman, O. Gercel, and E. Ayas, Chemical Engineering Research and Design, 141, 317-327, 2019; G. Bayramoglu and M. Yilmaz, Fibers and Polymers, 19, 4, 877-886, 2018; and G. Bayramoglu, B. Altintas, and M. Y. Arica, Journal of Chemical Technology & Biotechnology, 87, 5, 705-713, 2012]. Adsorption is an attractive method for a number of reasons. First, it requires less land area than other methods which require additional processing facilities. Adsorption also avoids the use of other toxic chemicals. It has greater flexibility in the design operation of the water treatment. It can also be used to treat a wide variety of chemical contaminants or be tailored to a specific impurity. Lastly, adsorption shows superior removal of organic contaminants compared to other methods intended for removal of inorganic contaminants, such as sequestration with magnetic particles or chemical coagulation. Therefore, significant attention has been directed to adsorption as a process for dye removal from wastewaters since it offers the most economical and effective treatment methods.

Recently, various research groups have used different low-cost waste natural materials as an adsorbent for the separation of basic dyes. Nurchi et al. [V. M. Nurchi, M. Crespo-Alonso, R. Biesuz et al., Arabian Journal of Chemistry, 7, 1, 133-138, 2014] investigated the sorption of chrysoidine on raw cork and cork entrapped in calcium alginate, and the amounts adsorbed were about 0.27 and 0.29 mmol/g of chrysoidine in aqueous solutions at a pH of 7. Jain et al. [R. Jain, V. K. Gupta, and S. Sikarwar, Journal of Hazardous Materials, 182, 1-3, 749-756, 2010] removed hazardous dye naphthol yellow S from wastewater using activated carbon and activated deoiled mustard. Mittal et al. [A. Mittal, J. Mittal, A. Malviya, and V. K. Gupta, Journal of Colloid and Interface Science, 344, 2, 497-507, 2010] investigated the adsorption of chrysoidine Y on bottom ash and deoiled soya. The dye sorption capacities of bottom ash (BET surface area of 870.5 $cm^2 \cdot g^{-1}$) and deoiled soya (BET surface area of 728.6 $cm^2 \cdot g^{-1}$) were determined as $3.61 \times 10^{-5}$ $mol \cdot g^{-1}$ and $1.92 \times 10^{-5}$ $mol \cdot g^{-1}$ at 30° C., respectively. Younes et al [M. M. Younes, I. I. El-Sharkawy, A. E. Kabeel, and B. B. Saha, Applied Thermal Engineering, 114, 5, 394-414, 2017] and Pal et al. [A. Pal, K. +u, S. Mitra et al., International Journal of Heat and Mass Transfer, 110, 7-19, 2017] have reviewed and studied biomass-derived activated carbons for adsorptive heat pump applications. Gupta et al. [V. K. Gupta, R. Jain, S. Malathi, and A. Nayak, Journal of Colloid and Interface Science, 348, 2, 628-633, 2010.] studied the removal of indigo carmine dye from industrial effluents by deoiled mustard and charcoal. The adsorption experiments were carried out at 30° C., pH 3.0 for charcoal and pH 8.0 for deoiled mustard, and adsorbate concentration $2 \times 10^{-4}$ $mol \cdot L^{-1}$. Amounts of adsorbates were found as approximately $0.33 \times 10^{-4}$ $mol \cdot L^{-1}$ for 0.40 $g \cdot L^{-1}$ for charcoal and $0.25 \times 10^{-4}$ $mol \cdot L^{-1}$ for 7.5 $g \cdot L^{-1}$ of deoiled mustard. Larous and Meniai [S. Larous and A.-H. Meniai, Energy Procedia, 18, 905-914, 2012] studied the use of sawdust carbonized by an acid/base treatment as an adsorbent for phenol. Raghuvanshi et al. [S. P. Raghuvanshi, R. Singh, C. P. Kaushik, and A. K. Raghav, International Journal of Environmental Studies, 62, 3, 329-339, 2005] used acid-treated sawdust as a bioadsorbent for the removal of methylene blue dye.

Chrysoidine is a type of industrial azoic dye. Due to its good dyeing fastness, it is widely used for dyeing leather, paper, feather, grass, wood, bamboo, etc. Chrysoidine can cause acute and chronic toxicity to mammals when taken orally or inhaled, and its median lethal concentration (LC50, 24 h) for fish is 0.5 mg/L. According to American Dye Manufacturing Institute (ADMI), the basic dyes are generally more toxic than acidic or direct dyes [American Dye Manufacturing Institute Inc., Dyes and the Environment, Reports on Selected Dyes and Their Effects, American Dye Manufacturing Institute Inc., Springfield, Va., USA, 1974].

In view of the forgoing, one object of the present disclosure is to provide a method for producing a modified sawdust sorbent material by sulfonating sawdust with sulfuric acid followed by oxidizing with hydrogen peroxide. This method provides a modified sawdust sorbent comprising sulfonated and oxidized sawdust having properties advantageous for use in water purification. Another object of the present disclosure is a method for removing dye from contaminated water using the modified sawdust sorbent.

SUMMARY OF THE INVENTION

The present disclosure relates to a method of making a modified sawdust sorbent. The method involves mixing sawdust with sulfuric acid to form a sulfonating mixture, heating the sulfonating mixture at 100 to 200° C. to form a sulfonated sawdust, washing and drying the sulfonated sawdust at 50 to 150° C. to form a dried sawdust, treating the dried sawdust with hydrogen peroxide solution to form a peroxide-treated sawdust, washing and drying the peroxide-treated sawdust at 50 to 150° C. to form a sulfonated and oxidized sawdust, and milling and sieving the sulfonated and oxidized sawdust to form the modified sawdust sorbent, wherein the modified sawdust sorbent has a dye adsorption capacity of 20 to 25 mg of dye per g of sorbent at 25 to 45° C.

In some embodiments, the sawdust is yellow pine sawdust.

In some embodiments, the sawdust is present in the sulfonating mixture in an amount of 45 to 65 wt % and the sulfuric acid is present in the sulfonating mixture in an amount of 35 to 55 wt %, each based on a total weight of the sulfonating mixture.

In some embodiments, the sulfuric acid is dilute sulfuric acid having a concentration of 0.1 to 4.2 mol/L.

In some embodiments, hydrogen peroxide is present in the hydrogen peroxide solution in an amount of 1 to 10 vol %, preferably 2.5 to 7.5 vol %, preferably 3 to 6.5 vol %, preferably 5 vol %, based on a total volume of the hydrogen peroxide solution.

In some embodiments, the treating is performed at ambient temperature for 1 to 3 hours.

In some embodiments, the sieving is performed with a sieve with 400 to 800 µm openings.

In some embodiments, the washing of the sulfonated sawdust and the washing of the peroxide-treated sawdust are performed with water.

In some embodiments, the heating of the sulfonating mixture is performed in a vacuum oven at a pressure of 0.01 to 0.25 atm.

In some embodiments, the drying of the sulfonated sawdust and the drying of the peroxide-treated sawdust are performed in a vacuum oven at a pressure of 0.01 to 0.25 atm.

In some embodiments, the modified sawdust sorbent has a moisture content of 0.1 to 10%, a pH of 2 to 7, a density of 0.35 to 0.65 g/cm$^3$, and a surface area of 1.75 to 2.85 m$^2$/g.

The present disclosure also relates to a modified sawdust sorbent comprising a sulfonated and oxidized sawdust having a moisture content of 0.1 to 10%, a pH of 2 to 7, a density of 0.35 to 0.65 g/cm$^3$, a surface area of 1.75 to 2.85 m$^2$/g, and a dye adsorption capacity of 20 to 50 mg of dye per g of sorbent at 25 to 45° C.

In some embodiments, the modified sawdust sorbent consists of particles that pass through a sieve with 400 to 800 µm openings.

The present disclosure also relates to a method for removing a dye from a contaminated water involving contacting the contaminated water with the modified sawdust sorbent of claim 12, and isolating the modified sawdust sorbent to produce a dye-impregnated sorbent and decontaminated water.

In some embodiments, the ratio of the weight of dye present to the weight of modified sawdust sorbent present at a beginning of the contacting is 75:1 to 40:1.

In some embodiments, the modified sawdust sorbent removes 97.50 to 99.99 of the dye from the contaminated water based on an initial amount of dye present in the contaminated water.

In some embodiments, the contacting comprises an adsorption having a free energy change of −6.5 to −2.75 kJ/mol of dye adsorbed.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE INVENTION

Figure 1:
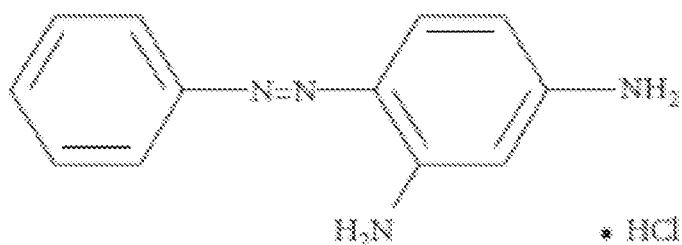
FIG. 1 shows the chemical structure of chrysoidine dye.

In the following description, it is understood that other embodiments may be utilized and structural and operational changes may be made without departure from the scope of the present embodiments disclosed herein.

The phrase "substantially free", unless otherwise specified, describes a particular component being present in an amount of less than about 1 wt. %, preferably less than about 0.5 wt. %, more preferably less than about 0.1 wt. %, even more preferably less than about 0.05 wt. %, yet even more preferably 0 wt. %, relative to a total weight of the composition being discussed.

As used herein, the terms "optional" or "optionally" means that the subsequently described event(s) can or cannot occur or the subsequently described component(s) may or may not be present (e.g., 0 wt. %).

As used herein, "sawdust" is a by-product or waste product of woodworking operations such as sawing, milling, planning, routing, drilling, sanding, and the like. Sawdust is composed of fine particles of wood. Typically, these particles of wood have a particle size of 0.25 to 10 mm. Larger particles are normally referred to as "wood chips". Sawdust is a wood product comprising cellulose, hemicellulose, and lignin. Cellulose is a polysaccharide consisting of linear chains of linked glucose units. Typically, cellulose is composed of approximately 5,000 to 15,000 individual glucose units. The glucose units are linked in a linear fashion, creating an unbranched polysaccharide. Cellulose consists of both crystalline and amorphous portions. These crystalline portions are very resistant to chemical degradation, such as acid or base hydrolysis, enzymatic digestion, or peroxide treatment. Hemicellulose is a polysaccharide consisting of linear and branched chains of linked glucose units. Unlike cellulose, hemicellulose chains are shorter, having typically 500 to 4,000 individual glucose units. Further, the chains of glucose units may be linear or branched in hemicellulose, distinct from the unbranched chains present in cellulose. Additionally, hemicellulose contains no crystalline portions. Hemicellulose may be chemically degraded by acid or base hydrolysis, enzymatic digestion, or peroxide treatment under milder conditions (such as lower temperature, more dilute acid or base concentration, shorter reaction time, etc.) compared to cellulose. Lignin is a class of cross-linked phenolic polymers that are present in wood. Typically, lignin comprises polymerized and crosslinked polymer chains of monolignols, phenylpropene compounds such as p-coumaryl alcohol, coniferyl alcohol, and sinapyl alcohol among others.

As used herein, "adsorption" is the adhesion of atoms, ions or molecules from a gas, liquid, or dissolved solid to a surface. The process creates a film of an adsorbate (e.g. the first gas) on the surface of an adsorbent (e.g. the fluorinated carbon adsorbent). Chemisorption is a kind of adsorption which involves a chemical reaction between the adsorbate and adsorbent, i.e., new chemical bonds are generated at the adsorbent surface. In contrast with chemisorption is physisorption, which leaves the chemical species of the adsorbate and adsorbent intact chemically unchanged upon adsorption.

According to a first aspect, the present disclosure relates to a method of making a modified sawdust sorbent. Generally, the method involves sulfonating sawdust using sulfuric acid followed by oxidizing the sulfonated sawdust with hydrogen peroxide.

In some embodiments, the sawdust is pine sawdust. Pine sawdust is sawdust from a pine tree. A pine tree refers to a coniferous tree in the genus *Pinus* of the family Pinaceae. Examples of pine trees include *P. brutia* (Turkish Pine), *P. canariensis*(Canary Island Pine), *P. cembra*(Swiss Pine), *P. halepensis*(Aleppo Pine), *P. heldreichii* (Bosnian Pine), *P. mugo* (Mountain Pine), *P. nigra* (European Black Pine or Austrian Pine), *P. peuce* (Macedonian Pine), *P. pinaster* (Maritime Pine), *P. pinea* (Stone Pine), *P. sylvestris* (Scots Pine), *P. amamiana* (Yakushima White Pine), *P. armandii* (Chinese White Pine), *P. bhutanica* (Bhutan White Pine), *P. bungeana* (Lacebark Pine), *P. dalatensis* (Vietnamese White Pine), *P. densata* (Sikang Pine), *P. densiflora* (Korean Red Pine), *P. eldarica* Medw. (Eldar Pine), *P. eremitana* North Vietnam White Pine), *P. fenzeliana* (Hainan White Pine), *P. fragilissima* (Wulu Pine), *P. gerardiana* (Chilgoza Pine), *P. henryi* (Henry's Pine), *P. hwangshanensis*—Huangshan Pine), *P. kesiya*—Khasi Pine), *P. koraiensis*—Korean Pine), *P. krempfii*—Krempf's Pine), *P. latteri*—Tenasserim Pine), *P. luchuensis* (Luchu Pine), *P. massoniana* (Masson's Pine), *P. merkusii* (Sumatran Pine), *P. morrisonicola* (Taiwan White Pine), *P. orthophylla* (Wuzhi Shan White Pine), *P. parviflora* (Japanese White Pine), *P. pumila* (Siberian Dwarf Pine), *P. roxburghii* (Chir Pine), *P. sibirica* (Siberian Pine), *P. squamata* (Qiaojia Pine), *P. tabuliformis* (Chinese Red Pine), *P. taiwanensis* (Taiwan Red Pine), *P. thunbergii* (Japanese Black Pine), *P. uyematsui* (Uyematsu White Pine), *P. wallichiana* (Blue Pine or Bhutan Pine), *P. wangii* (syn. *P. kwangtungensis*) (Guangdong White Pine), *P. yunnanensis* (Yunnan Pine), *P. banksiana* (Jack Pine), *P. clausa* (Sand Pine), *P. echinata* (Shortleaf Pine), *P. elliottii* (Slash Pine), *P. glabra* (Spruce Pine), *P. palustris* (Longleaf Pine), *P. pungens* (Table Mountain Pine), *P. resinosa* (Red Pine), *P. rigida* (Pitch Pine), *P. serotina* (Pond Pine), *P. strobus* (Eastern White Pine), *P. taeda* (Loblolly Pine), *P. virginiana* (Virginia Pine), *P. albicaulis* (Whitebark Pine), *P. aristata* (Rocky Mountains Bristlecone Pine), *P. attenuata* (Knobcone Pine), *P. balfouriana* (Foxtail Pine), *P. contorta* (Lodgepole Pine), *P. coulteri* (Coulter Pine), *P. edulis* (Colorado Pinyon), *P. flexilis* (Limber Pine), *P. jeffreyi* (Jeffrey Pine), *P. lambertiana* (Sugar Pine), *P. longaeva* (Great Basin Bristlecone Pine), *P. monophylla* (Single-leaf Pinyon), *P. monticola* (Western White Pine), *P. muricata* (Bishop Pine), *P. ponderosa* (syn. *P. washoensis*) (Ponderosa Pine), *P. radiata* (Monterey Pine or Radiata Pine), *P. remota* (Texas Pinyon or Papershell Pinyon), *P. sabineana* (Gray Pine, Foothill Pine, or Digger Pine), *P. strobiformis* (Southwestern White Pine), *P. torreyana* (Torrey Pine), *P. arizonica* (Arizona Pine), *P. ayacahuite* (Mexican White Pine), *P. caribaea* (Caribbean Pine), *P. cembroides* (Mexican Pinyon), *P. chiapensis* (Chiapas White Pine), *P. cooperi* (Cooper's Pine), *P. cubensis* (Cuban Pine), *P. culminicola* (Potosi Pinyon), *P. devoniana* (syn. *P. michoacana*) (Michoacan Pine), *P. durangensis* (Durango Pine), *P. engelmannii* (Apache Pine), *P. estevezii* (Estevez's Pine), *P. gordoniana* (syn. *P. douglasiana*) (Gordon's Pine), *P. greggii* (Gregg's Pine), *P. hartwegii* (Hartweg's Pine), *P. herrerae* (Herrera's Pine), *P. hondurensis* (syn. *P. caribaea* var. *hondurensis*) (Honduras Pine), *P. jaliscana* (Jalisco Pine), *P. johannis* (Johann's Pinyon), *P. lawsonii* (Lawson's Pine), *P. leiophylla* (Chihuahua Pine), *P. lumholtzii* (Lumholtz's Pine), *P. luzmariae P. maximartinezii* (Big-cone Pinyon), *P. maximinoi* (syn. *P. tenuifolia*) (Thinleaf Pine), *P. montezumae* (Montezuma Pine), *P. nelsonii* (Nelson's Pinyon), *P. occidentalis* (Hispaniolan Pine), *P. oocarpa* (Egg-cone Pine), *P. patula* (Patula Pine), *P. orizabensis* (Orizaba Pinyon), *P. pinceana* (Weeping Pinyon), *P. praetermissa* (McVaugh's Pine), *P. pringlei* (Pringle's Pine), *P. pseudostrobus* (Smooth-bark Mexican Pine), *P. quadrifolia* (Parry Pinyon), *P. rzedowskii* (Rzedowski's Pine), *P. strobiformis* (Chihuahua White Pine), *P. tecunumanii* (Tecun Uman Pine), *P. teocote* (Teocote Pine), and *P. tropicalis* (Tropical Pine).

In preferred embodiments, the pine sawdust is yellow pine sawdust. Yellow pine sawdust is sawdust derived from *P. palustris* (longleaf pine), *P. echinata* (shortleaf pine), *P. elliottii* (slash pine), *P. jeffreyi* (Jeffrey pine), *P. ponderosa* (*ponderosa* pine), *P. taeda* (loblolly pine), *P. strobus* (eastern white pine), or *P. sylvestris* (Scots pine).

First, sawdust is mixed with sulfuric acid to form a sulfonating mixture. In some embodiments, the sawdust is present in the sulfonating mixture in an amount of 45 to 65 wt %, preferably 47.5 to 62.5 wt %, preferably 50 to 60 wt %, preferably 52.5 to 57.5 wt %, preferably 55 to 57.25 wt % based on a total weight of the sulfonating mixture. In some embodiments, the sulfuric acid is present in the sulfonating mixture in an amount of 35 to 55 wt %, preferably 37.5 to 52.5 wt %, preferably 40 to 50 wt %, preferably 41 to 47.5 wt %, preferably 42 to 45 wt %, preferably 42.5 to 44 wt % based on a total weight of the sulfonating mixture. In some embodiments, the sulfuric acid is dilute sulfuric acid having a concentration of 0.1 to 4.2 mol/L, preferably 0.25 to 4 mol/L, preferably 0.33 to 3.5 mol/L, preferably 0.5 to 3 mol/L, preferably 0.66 to 2.5 mol/L, preferably 0.75 to 2 mol/L, preferably 1 to 1.5 mol/L. In alternative embodiments, the sulfuric acid is concentrated sulfuric acid having a concentration of 4.25 to 8.4 mol/L, preferably 4.5 to 8.0 mol/L, preferably 5 to 7.5 mol/L, preferably 6 to 7 mol/L.

The sulfonating mixture is then heated. In some embodiments, the sulfonating mixture is heated at 100 to 200 C, preferably 110 to 190° C., preferably 120 to 180° C., preferably 130 to 170° C., preferably 140 to 160° C., preferably 150° C. In some embodiments, the heating is performed in a vacuum oven. In some embodiments, the heating in a vacuum oven is performed at a pressure of 0.01 to 0.25 atm, preferably 0.05 to 0.2 atm, preferably 0.1 to 0.15 atm.

In some embodiments the sulfonated sawdust is isolated by any solid-liquid separation technique known to those of ordinary skill in the art, for example, filtration, decantation, centrifugation, or the like, but excluding techniques such as evaporation. In some embodiments, the washing is performed with a wash solution. In some embodiments, the wash solution comprises water. In some embodiments, the aforementioned water is tap water, distilled water, bi-distilled water, deionized water, deionized distilled water, reverse osmosis water, and/or some other water. In one embodiment the water is distilled or treated with reverse osmosis to eliminate trace metals. Preferably the water is deionized, deionized distilled, bi-distilled, or reverse osmosis water, and at 25° C. has a conductivity of less than 10 $\mu$S·cm$^{-1}$, preferably less than 1 $\mu$S·cm$^{-1}$; a resistivity of greater than 0.1 M$\Omega$·cm, preferably greater than 1 M$\Omega$·cm, more preferably greater than 10 M$\Omega$·cm; a total solid concentration of less than 5 mg/kg, preferably less than 1 mg/kg; and a total organic carbon concentration of less than 1000 $\mu$g/L, preferably less than 200 $\mu$g/L, more preferably less than 50 $\mu$g/L. In some embodiments, the sulfonated sawdust is washed 1 to 5 times, preferably 2 to 4 times, preferably 3 times.

Following the washing, the sulfonated sawdust is dried. In some embodiments, the drying is performed at a temperature of 50 to 150° C., preferably 60 to 140° C., preferably 70 to 130° C., preferably 80 to 120° C., preferably 90 to 110° C., preferably 100° C. In some embodiments, the drying is performed for 1 to 72 hours, preferably 4 to 66 hours, preferably 6 to 60 hours, preferably 8 to 54 hours, preferably 12 to 36 hours, preferably 16 to 32 hours, preferably 18 to 30 hours, preferably 20 to 28 hours, preferably 22 to 26 hours, preferably 24 hours. In some embodiments, the drying takes place in ambient atmosphere. In some embodiments, the drying takes place in a vacuum oven. In some embodiments, the drying in a vacuum oven is performed at a pressure of 0.01 to 0.25 atm, preferably 0.05 to 0.2 atm, preferably 0.1 to 0.15 atm. This washing and drying produces a dried sawdust.

In some embodiments, the dried sawdust is optionally milled and sieved. The milling may be performed by a technique such as milling, grinding, ball milling, chopping, pulverizing, crushing, pounding, mincing, shredding, smashing, fragmenting, or another technique that may be used to reduce a material to small particles. In some embodiments, the milling may take place using a mill, ball mill, rod mill, autogenous mill, semi-autogenous grinding mill, pebble mill, buhrstone mill, burr mill, tower mill, vertical shaft impactor mill, a low energy milling machine, grinder, pulverizer, mortar and pestle, blender, crusher, or other implement used to reduce a material to small particles. In some embodiments, the milling is performed in an inert atmosphere, preferably provided by inert gas such as argon gas, though in another embodiment, the milling may be performed in air. The dried sawdust may be milled for up to 10 hours, or up to 5 hours, or up to 2 hours, preferably for 10-90 minutes, preferably for 45-75 minutes. In some embodiments, the sieving is performed with an apparatus configured to allow particles of a material of and below a certain size, defined by openings in the sieve portion of the apparatus, to pass and be separated from particles above the certain size. In some embodiments, the sieving is done by agitating the dried sawdust while it is atop and being supported by the sieve portion of the apparatus and allowing particles that pass through the sieve to be separated from particles that do not by gravity. In some embodiments, the sieving is done by agitating the sieve portion or other portion of the apparatus while the dried sawdust is atop and being supported by the sieve portion of the apparatus and allowing particles that pass through the sieve to be separated from particles that do not by gravity. In some embodiments, the dried sawdust is forced through the sieve portion of the apparatus by a force other than gravity. In some embodiments, the forcing of the dried sawdust reduced particles of dried sawdust that from a size that does not pass through the sieve to a size that does pass through the sieve by reduction of the particle size by contact with the sieve. In preferred embodiments, the sieving is performed with a sieve with openings of 400 to 800 $\mu$m, preferably 450 to 750 $\mu$m, preferably 500 to 700 $\mu$m, preferably 525 to 675 $\mu$m, preferably 550 to 650 $\mu$m, preferably 575 to 625 $\mu$m, preferably 600 $\mu$m.

Next, the dried sawdust is treated with hydrogen peroxide solution to form a peroxide-treated sawdust. In some embodiments, hydrogen peroxide is present in the hydrogen peroxide solution in an amount of 1 to 30 vol %, preferably 3 to 15 vol %, preferably 4 to 10 vol %, preferably 5 vol %. In some embodiments, the dried sawdust is treated with hydrogen peroxide solution in a ratio of 100 to 1000 mL of hydrogen peroxide solution per 100 g of dried sawdust, preferably 150 to 850 mL of hydrogen peroxide solution per 100 g of dried sawdust, preferably 250 to 750 mL of hydrogen peroxide solution per 100 g of dried sawdust, preferably 350 to 650 mL of hydrogen peroxide solution per 100 g of dried sawdust, preferably 400 to 600 mL of hydrogen peroxide solution per 100 g of dried sawdust, preferably 450 to 550 mL of hydrogen peroxide solution per 100 g of dried sawdust, preferably 500 mL of hydrogen peroxide solution per 100 g of dried sawdust. In some embodiments, the treating is performed at ambient temperature (i.e. 23 to 26° C.). In some embodiments, the treating is performed for 1 to 3 hours, preferably 1.25 to 2.75 hours, preferably 1.5 to 2.5 hours, preferably 1.75 to 2.25 hours, preferably 2 hours. This treatment produces a peroxide-treated sawdust.

In some embodiments the peroxide-treated sawdust is isolated by any solid-liquid separation technique known to those of ordinary skill in the art, for example, filtration, decantation, centrifugation, or the like, but excluding techniques such as evaporation. In some embodiments, the washing is performed with a wash solution. In some embodiments, the wash solution comprises water. In some embodiments, the aforementioned water is tap water, distilled water, bidistilled water, deionized water, deionized distilled water, reverse osmosis water, and/or some other water. In one embodiment the water is distilled or treated with reverse osmosis to eliminate trace metals. Preferably the water is deionized, deionized distilled, bidistilled, or reverse osmosis water, and at 25° C. has a conductivity of less than 10 $\mu S \cdot cm^{-1}$, preferably less than 1 $\mu S \cdot cm^{-1}$; a resistivity of greater than 0.1 $M\Omega \cdot cm$, preferably greater than 1 $M\Omega \cdot cm$, more preferably greater than 10 $M\Omega \cdot cm$; a total solid concentration of less than 5 mg/kg, preferably less than 1 mg/kg; and a total organic carbon concentration of less than 1000 μg/L, preferably less than 200 μg/L, more preferably less than 50 μg/L. In some embodiments, the peroxide-treated sawdust is washed 1 to 5 times, preferably 2 to 4 times, preferably 3 times.

Following the washing, the peroxide-treated sawdust is dried. In some embodiments, the drying is performed at a temperature of 30 to 125° C., preferably 40 to 100° C., preferably 45 to 90° C., preferably 50 to 80° C., preferably 55 to 70° C., preferably 60° C. In some embodiments, the drying is performed for 1 to 36 hours, preferably 2 to 32 hours, preferably 4 to 28 hours, preferably 6 to 24 hours, preferably 8 to 20 hours, preferably 10 to 16 hours, preferably 11 to 13 hours, preferably 12 hours. In some embodiments, the drying takes place in ambient atmosphere. In some embodiments, the drying takes place in a vacuum oven. In some embodiments, the drying in a vacuum oven is performed at a pressure of 0.01 to 0.25 atm, preferably 0.05 to 0.2 atm, preferably 0.1 to 0.15 atm. This washing and drying produces a sulfonated and oxidized sawdust.

In some embodiments, the sulfonated and oxidized sawdust is milled and sieved. The milling may be performed by a technique such as milling, grinding, ball milling, chopping, pulverizing, crushing, pounding, mincing, shredding, smashing, fragmenting, or another technique that may be used to reduce a material to small particles. In some embodiments, the milling may take place using a mill, ball mill, rod mill, autogenous mill, semi-autogenous grinding mill, pebble mill, buhrstone mill, burr mill, tower mill, vertical shaft impactor mill, a low energy milling machine, grinder, pulverizer, mortar and pestle, blender, crusher, or other implement used to reduce a material to small particles. In some embodiments, the milling is performed in an inert atmosphere, preferably provided by inert gas such as argon gas, though in another embodiment, the milling may be performed in air. The sulfonated and oxidized sawdust may be milled for up to 10 hours, or up to 5 hours, or up to 2 hours, preferably for 10-90 minutes, preferably for 45-75 minutes. In some embodiments, the sieving is performed with an apparatus configured to allow particles of a material of and below a certain size, defined by openings in the sieve portion of the apparatus, to pass and be separated from particles above the certain size. In some embodiments, the sieving is done by agitating the sulfonated and oxidized sawdust while it is atop and being supported by the sieve portion of the apparatus and allowing particles that pass through the sieve to be separated from particles that do not by gravity. In some embodiments, the sieving is done by agitating the sieve portion or other portion of the apparatus while the sulfonated and oxidized sawdust is atop and being supported by the sieve portion of the apparatus and allowing particles that pass through the sieve to be separated from particles that do not by gravity. In some embodiments, the sulfonated and oxidized sawdust is forced through the sieve portion of the apparatus by a force other than gravity. In some embodiments, the forcing of the sulfonated and oxidized sawdust reduced particles of sulfonated and oxidized sawdust that from a size that does not pass through the sieve to a size that does pass through the sieve by reduction of the particle size by contact with the sieve. In preferred embodiments, the sieving is performed with a sieve with openings of 400 to 800 μm, preferably 450 to 750 μm, preferably 500 to 700 μm, preferably 525 to 675 μm, preferably 550 to 650 μm, preferably 575 to 625 μm, preferably 600 μm.

In some embodiments, the modified sawdust sorbent produced by the method has a moisture content of 0.1 to 10%, preferably 1 to 7.5%, preferably 2 to 7%, preferably 3 to 6%, preferably 4 to 5.5%. In some embodiments, the modified sawdust sorbent has a pH of 2 to 7, preferably 2.5 to 6.5, preferably 3 to 6, preferably 3.5 to 5.5, preferably 4 to 5. In some embodiments, the modified sawdust sorbent has a density of 0.350 to 0.650 $g/cm^3$, preferably 0.375 to 0.625 $g/cm^3$, preferably 0.400 to 0.600 $g/cm^3$, preferably 0.425 to 0.575 $g/cm^3$, preferably 0.450 to 0.550 $g/cm^3$, preferably 0.475 to 0.525 $g/cm^3$. In some embodiments, the modified sawdust sorbent has a surface area of 1.75 to 2.85 $m^2/g$, preferably 1.80 to 2.80 $m^2/g$, preferably 1.85 to 2.75 $m^2/g$, preferably 1.90 to 2.70 $m^2/g$, preferably 1.95 to 2.65 $m^2/g$, preferably 2.00 to 2.50 $m^2/g$, preferably 2.05 to 2.45 $m^2/g$, preferably 2.10 to 2.40 $m^2/g$, preferably 2.15 to 2.35 $m^2/g$.

In some embodiments, the modified sawdust sorbent is capable of adsorbing organic dyes. In some embodiments, the modified sawdust sorbent produced by the method has a dye adsorption capacity of 20 to 50 mg, preferably 22.5 to 47.5 mg, preferably 25 to 45 mg, preferably 27.5 to 42.5 mg, preferably 30 to 40 mg, preferably 32.5 to 37.5 mg of dye per g of sorbent at 25 to 45° C.

A second aspect of the disclosure relates to a modified sawdust sorbent comprising a sulfonated and oxidized sawdust. This sulfonated and oxidized sawdust may comprise cellulose, hemicellulose, lignin, or derivatives of these. The derivatives may comprise sulfonated cellulose, sulfonated hemicellulose, sulfonated lignin, oxidized cellulose, oxidized hemicellulose, oxidized lignin, sulfonated and oxidized cellulose, sulfonated and oxidized hemicellulose, and sulfonated and oxidized lignin. In some embodiments, the sulfonated and oxidized sawdust comprises cellulose, sulfonated cellulose, oxidized cellulose, and sulfonated and oxidized cellulose. In some embodiments, the sulfonated and oxidized sawdust is substantially free of hemicellulose, sulfonated hemicellulose, oxidized hemicellulose, and sulfonated and oxidized hemicellulose. In some embodiments, the sulfonated and oxidized sawdust is substantially free of lignin, sulfonated lignin, oxidized lignin, and sulfonated and oxidized lignin. Sulfonated cellulose may be distinguished from cellulose by the presence of various sulfur-containing functional groups attached to the cellulose. Examples of such sulfur-containing functional groups include sulfonates ($R-SO_3^-$), sulfonic acids ($R-SO_3H$), sulfates (R—O—SO$_3^-$), sulfinic acids (R—SO$_2$H), sulfoxides (R—SO—R'), sulfonate esters (R—SO$_3$—R'), and sulfones (R—SO$_2$—R'). In some embodiments, sulfur-containing functional groups are present in the sulfonated cellulose in an amount of one sulfur-containing functional group per every 1000 glucose subunits to two sulfur-containing functional groups per glucose subunit, preferably one sulfur-containing functional group per every 750 glucose subunits to one sulfur-containing functional group per glucose subunit, preferably one sulfur-containing functional group per every 500 glucose subunits to one sulfur-containing functional group per every 2 glucose subunits, preferably one sulfur-containing functional group per every 250 glucose subunits to one sulfur-containing functional group per every 5 glucose subunits, preferably one sulfur-containing functional group per every 100 glucose subunits to one sulfur-containing functional group per every 10 glucose subunits.

Oxidized cellulose may be distinguished from cellulose by the presence of various oxygen-containing functional groups attached to the cellulose that are not the ether (R—O—R') or hydroxyl (R—OH) groups native to cellulose. Examples of such oxygen-containing functional groups not native to cellulose include carboxylic acids (R—CO$_2$H), aldehydes (R—COH), and ketones (R—CO—R'). In some embodiments, oxygen-containing functional groups not native to cellulose are present in the oxidized cellulose in an amount of one oxygen-containing functional group not native to cellulose per every 1000 glucose subunits to two oxygen-containing functional groups not native to cellulose per glucose subunit, preferably one oxygen-containing functional group not native to cellulose per every 750 glucose subunits to one oxygen-containing functional group not native to cellulose per glucose subunit, preferably one oxygen-containing functional group not native to cellulose per every 500 glucose subunits to one oxygen-containing functional group not native to cellulose per every 2 glucose subunits, preferably one oxygen-containing functional group not native to cellulose per every 250 glucose subunits to one oxygen-containing functional group not native to cellulose per every 5 glucose subunits, preferably one oxygen-containing functional group not native to cellulose per every 100 glucose subunits to one oxygen-containing functional group not native to cellulose per every 10 glucose subunits.

Sulfonated and oxidized cellulose may be distinguished from cellulose by the presence of both various sulfur-containing functional groups and various oxygen-containing functional groups attached to the cellulose that are not the ether (R—O—R') or hydroxyl (R—OH) groups native to cellulose. In some embodiments, sulfur-containing functional groups are present in the sulfonated and oxidized cellulose in an amount as described above for sulfonated cellulose. In some embodiments, oxygen-containing functional groups not native to cellulose are present in the oxidized cellulose in an amount as described above for oxidized cellulose.

As used in the preceding paragraphs, R and R' may be understood to generally mean a group of atoms forming the rest of an organic molecule to which the functional groups described are attached.

In some embodiments, the modified sawdust sorbent comprises cellulose, sulfonated cellulose, oxidized cellulose, and sulfonated and oxidized cellulose. In alternative embodiments, the modified sawdust sorbent comprises sulfonated cellulose, oxidized cellulose, and sulfonated and oxidized cellulose but is devoid of cellulose. In alternative embodiments, the modified sawdust sorbent comprises sulfonated and oxidized cellulose but is devoid of cellulose, sulfonated cellulose, and oxidized cellulose. In preferred embodiments, the modified sawdust sorbent comprises at least 51 wt % sulfonated and oxidized cellulose, preferably at least 55 wt % sulfonated and oxidized cellulose, preferably at least 60 wt % sulfonated and oxidized cellulose, preferably at least 65 wt % sulfonated and oxidized cellulose, preferably at least 70 wt % sulfonated and oxidized cellulose, preferably at least 75 wt % sulfonated and oxidized cellulose, preferably at least 80 wt % sulfonated and oxidized cellulose, preferably at least 85 wt % sulfonated and oxidized cellulose, preferably at least 90 wt % sulfonated and oxidized cellulose based on a total weight of the modified sawdust sorbent. In some embodiments, the modified sawdust sorbent comprises less than 49 wt % cellulose, preferably less than 40 wt % cellulose, preferably less than 30 wt % cellulose, preferably less than 20 wt % cellulose, preferably less than 10 wt % cellulose, preferably less than 5 wt % cellulose, based on a total weight of the modified sawdust sorbent. In some embodiments, the modified sawdust sorbent comprises less than 49 wt % sulfonated cellulose, preferably less than 40 wt % sulfonated cellulose, preferably less than 30 wt % sulfonated cellulose, preferably less than 20 wt % sulfonated cellulose, preferably less than 10 wt % sulfonated cellulose, preferably less than 5 wt % sulfonated cellulose, based on a total weight of the modified sawdust sorbent. In some embodiments, the modified sawdust sorbent comprises less than 49 wt % oxidized cellulose, preferably less than 40 wt % oxidized cellulose, preferably less than 30 wt % oxidized cellulose, preferably less than 20 wt % oxidized cellulose, preferably less than 10 wt % oxidized cellulose, preferably less than 5 wt % oxidized cellulose, based on a total weight of the modified sawdust sorbent. In some embodiments, sulfur is present in the modified sawdust sorbent in an amount of 0.01 to 25 wt %, preferably 0.015 to 20 wt %, preferably 0.0225 to 15 wt %, preferably 0.0475 to 10 wt %, preferably 0.1 to 5 wt %, preferably 0.25 to 2.5 wt % based on a total weight of modified sawdust sorbent. In some embodiments, oxygen is present in the modified sawdust sorbent in an amount of 45 to 61 wt %, preferably 46 to 60 wt %, preferably 47.5 to 57.5 wt %, preferably 48.5 to 55 wt %, preferably 49 to 52.5 wt %, preferably 49.25 to 52 wt % based on a total weight of modified sawdust sorbent.

In some embodiments, the modified sawdust has a moisture content of 0.1 to 10 wt %, preferably 1 to 7.5 wt %, preferably 2 to 7 wt %, preferably 3 to 6 wt %, preferably 4 to 5.5 wt % based on a total weight of the modified sawdust sorbent. In some embodiments, the modified sawdust sorbent has a pH of 2 to 7, preferably 2.5 to 6.5, preferably 3 to 6, preferably 3.5 to 5.5, preferably 4 to 5. In some embodiments, the modified sawdust sorbent has a density of 0.350 to 0.650 g/cm$^3$, preferably 0.375 to 0.625 g/cm$^3$, preferably 0.400 to 0.600 g/cm$^3$, preferably 0.425 to 0.575 g/cm$^3$, preferably 0.450 to 0.550 g/cm$^3$, preferably 0.475 to 0.525 g/cm$^3$. In some embodiments, the modified sawdust sorbent has a surface area of 1.75 to 2.85 m$^2$/g, preferably 1.80 to 2.80 m$^2$/g, preferably 1.85 to 2.75 m$^2$/g, preferably 1.90 to 2.70 m$^2$/g, preferably 1.95 to 2.65 m$^2$/g, preferably 2.00 to 2.50 m$^2$/g, preferably 2.05 to 2.45 m$^2$/g, preferably 2.10 to 2.40 m$^2$/g, preferably 2.15 to 2.35 m$^2$/g.

In preferred embodiments, the modified sawdust sorbent is in the form of particles. In some embodiments, the modified sawdust sorbent is comprised of particles having a mean particle size of less than 600 µm, preferably less than 590 µm, preferably less than 580 µm, preferably less than 575 μm, preferably less than 550 μm, preferably less than 525 μm. The particles may have a spherical shape, or may be shaped like cylinders, boxes, blocks, spikes, flakes, plates, ellipsoids, toroids, stars, ribbons, discs, rods, granules, prisms, cones, platelets, sheets, angular chunks, or some other shape. In one embodiment, the modified sawdust sorbent may be in the form of agglomerates. As used herein, the term "agglomerates" refers to a clustered particulate composition comprising primary particles, the primary particles being aggregated together in such a way so as to form clusters thereof, at least 50 volume percent of the clusters having a mean diameter that is at least 2 times the mean diameter of the primary particles, and preferably at least 90 volume percent of the clusters having a mean diameter that is at least 5 times the mean diameter of the primary particles. The primary particles may be the particles of modified sawdust sorbent having a mean diameter as previously described. In some embodiments, the surface of the particles or agglomerates of the modified sawdust sorbent are irregular and non-smooth. In preferred embodiments, the particles pass through a sieve with openings of 400 to 800 μm, preferably 450 to 750 μm, preferably 500 to 700 μm, preferably 525 to 675 μm, preferably 550 to 650 μm, preferably 575 to 625 μm, preferably 600 μm.

In some embodiments, the modified sawdust sorbent is capable of adsorbing organic dyes. In some embodiments, the modified sawdust sorbent produced has a dye adsorption capacity of 20 to 50 mg, preferably 22.5 to 47.5 mg, preferably 25 to 45 mg, preferably 27.5 to 42.5 mg, preferably 30 to 40 mg, preferably 32.5 to 37.5 mg of dye per g of sorbent at 25 to 45° C.

In some embodiments, the adsorbed organic dyes are adsorbed to the modified sawdust sorbent through interaction with the sulfonated and oxidized sawdust. In some embodiments, the interaction between the organic dye and the sulfonated and oxidized sawdust are at least one selected from the group consisting of 7C-7r interactions, hydrogen bonding, electrostatic interactions, and Van der Waals interactions. In some embodiments, the adsorbed organic dyes are adsorbed to the modified sawdust sorbent through interaction with the sulfonated and oxidized cellulose. In some embodiments, the interaction between the organic dye and the sulfonated and oxidized cellulose are at least one selected from the group consisting of 7C-7E interactions, hydrogen bonding, electrostatic interactions, and Van der Waals interactions.

A third aspect of the disclosure relates to a method for removing an organic dye from contaminated water using the modified sawdust sorbent described above. In some embodiments, only one organic dye is present in the contaminated water. In alternative embodiments, a plurality of organic dyes are present in the contaminated water. The method involves contacting the modified sawdust sorbent with contaminated water containing one or more organic dyes.

A dye is a colored substance that chemically binds to a material it may be intended to color. Generally, a dye is applied in solution, typically aqueous solution. Examples of dyes include, but are not limited to: acridine dyes, which are acridine and its derivatives such as acridine orange, acridine yellow, acriflavine, and gelgreen; anthraquinone dyes, which are anthroaquinone and its derivatives such as acid blue 25, alizarin, anthrapurprin, carminic acid, 1,4-diamno-2,3-dihydroanthraquinone, 7,14-dibenzypyrenequinone, dibromoanthrone, 1,3-dihydroxyanthraquinone, 1,4-dihydroxyanthraquinone, disperse red 9, disperse red 11, indanthrone blue, morindone, oil blue 35, parietin, quinizarine green SS, remazol brilliant blue R, solvent violet 13, 1,2,4-trihydroxyanthraquinone, vat orange 1, and vat yellow 1; diaryl methane dyes such as auramine O, triarylmethane dyes such as acid fuchsin, aluminon, aniline blue WS, aurin, aurintricarboxylic acid, brilliant blue FCF, brilliant green, bromocresol green, bromocresol purple, bromocresol blue, bromophenol blue, bromopyrogallol red, chlorophenol red, coomassie brilliant blue, cresol red, O-cresolphthalein, crystal violet, dichlorofluorescein, ethyl green, fast green FCT, FIAsH-EDT2, fluoran, fuchsine, green S, light green SF, malachite green, merbromin, metacresol purple, methyl blue, methyl violet, naphtholphthalein, new fuchsine, pararosaniline, patent blue V, phenol red, phenolphthalein, phthalein dye, pittacal, spirit blue, thymol blue, thymolphthalein, Victoria blue BO, Victoria blue R, water blue, xylene cyanol, and xylenol orange; azo dyes such as acid orange 5, acid red 13, alican yellow, alizarine yellow R, allura red AC, amaranth, amido black 10B, aniline yellow, arylide yellow, azo violet, azorubine, basic red 18, biebrich scarlet, Bismarck brown Y, black 7984, brilliant black BN, brown FK, chrysoine resorcinol, chrysoidine, citrus red 2, congo red, D&C red 33, direct blue 1, disperse orange 1, eriochrome black T, evans blue, fast yellow AB, orange 1, hydroxynaphthol blue, janus green B, lithol rubine BK, metanil yellow, methyl orange, methyl red, methyl yellow, mordant brown 33, mordant red 19, naphthol AS, oil red O, oil yellow DE, orange B, orange G, orange GGN, para red, pigment yellow 10, ponceau 2R, prontosil, red 2G, scarlet GN, Sirius red, solvent red 26, solvent yellow 124, sudan black B, sudan I, sudan red 7B, sudan stain, tartrazine, tropaeolin, trypan blue, and yellow 2G; phthalocyanine dyes such as phthalocyanine blue BN, phthalocyanine Green G, Alcian blue, and naphthalocyanine, azin dyes such as basic black 2, mauveine, neutral red, Perkin's mauve, phenazine, and safranin; indophenol dyes such as indophenol and dichlorophenolindophenol; oxazin dyes; oxazone dyes; thiazine dyes such as azure A, methylene blue, methylene green, new methylene blue, and toluidine blue; thiazole dyes such as primuline, stains-all, and thioflavin; xanthene dyes such as 6-carboxyfluorescein, eosin B, eosin Y, erythosine, fluorescein, rhodamine B, rose bengal, and Texas red; fluorone dyes such as calcein, carboxyfluorescein diacetate succinimidyl ester, fluo-3, fluo-4, indian yellow, merbromin, pacific blue, phloxine, and seminaphtharhodafluor; or rhodamine dyes such as rhodamine, rhodamine 6G, rhodamine 123, rhodamine B, sulforhodamine 101, and sulforhodamine B.

In some embodiments, the modified sawdust sorbent may be free flowing or supported on or within a substrate, for example, a column. Examples of supported modified sawdust sorbents include materials and geometries where the modified sawdust sorbent is supported within a fixed bed, a static packed bed, a fluidized bed, embedded in a porous support (such as a porous polymer matrix), in or on a ceramic support, in or on a polymer support, or in or on a silica support. In some embodiments, the modified sawdust sorbent is employed in an amount of 1 to 1000 g/L, preferably 5 to 750 g/L, preferably 10 to 500 g/L, preferably 15 to 400 g/L, preferably 25 to 350 g/L, preferably 50 to 250 g/L of contaminated water to have organic dyes removed. In some embodiments, the ratio of the weight of modified sawdust sorbent present to the amount of dye present at the beginning of the contacting is 250:1 to 50:1, preferably 225:1 to 75:1, preferably 200:1 to 80:1.

In some embodiments, the method involves addition of modified sawdust sorbent to the contaminated water to have an organic dye be removed to form a purification mixture. In some embodiments, the purification mixture is shaken, stirred, agitated, or other method of achieving temporary homogeneity of the purification mixture. In preferred embodiments, the purification mixture is shaken at 10 to 1000 rpm, preferably 50 to 500 µm, preferably 125 to 250 rpm, preferably 150 rpm.

In alternative embodiments, the contacting comprises delivering a mixture into a feed side of a chamber comprising the modified sawdust sorbent that divides the chamber into the feed side and a permeate side, such that at least a portion of the contaminated water permeates the modified sawdust sorbent and recovering from the permeate side decontaminated water depleted in the organic dye compared to the water supplied to the feed side. The chamber used for the present method may be of any shape so long as the modified sawdust sorbent can be securely housed and utilized inside the chamber to accomplish the removal of the organic dye. The chamber may also include an inlet configured to accept feed material, a first outlet configured to expel a permeate, and an optional second outlet configured to expel a retentate. The chamber can be configured to be pressurized so as to push feed material though the inlet, permeate through the first outlet and optionally, retentate through the second outlet. The chamber can alternatively be configured to operate at reduced pressure as to pull feed material through the inlet, permeate out through the first outlet and optionally, retentate out through the second outlet. The chamber may also include a pump to provide a force for moving water from the feed side to the permeate side. In one or more embodiments, a force is provided to deliver the contaminated water into contact with the modified sawdust sorbent. The contaminated water may have a flow rate of 0.001 L/min to 1,000 L/min, 0.005 L/min to 500 L/min, 0.01 L/min to 100 L/min, 0.05 L/min to 10 L/min, 0.1 L/min to 5 L/min, or 0.5 L/min to 2 L/min. Alternatively, the water may stay stagnant over the modified sawdust sorbent or be stirred, shaken, or agitated as previously described.

In some embodiments, the contaminated water used in the method has a temperature of 1 to 99° C., preferably 20 to 90° C., preferably 21 to 75° C., preferably 25 to 50° C. In some embodiments, the contaminated water has a pH of 6.5 to 14, preferably 6.6 to 13, preferably 6.75 to 12, preferably 7 to 11. In preferred embodiments, the contaminated water and the modified sawdust sorbent are in contact for 5 to 120 minutes, preferably 15 to 105 minutes, preferably 30 to 90 minutes, preferably 40 to 60 minutes.

In some embodiments, the contacting is performed by passing the contaminated water through the modified sawdust sorbent. In some embodiments, the modified sawdust sorbent may be used in series with other currently known adsorption materials to enhance the removal of an organic dye from contaminated water or to remove a different type of impurity from water that is not an organic dye.

In terms of the present disclosure, the adsorption interaction between the organic dye and the modified sawdust sorbent may be chemisorption, physisorption, or mixtures thereof. In at least one embodiment, organic dye is adsorbed onto the modified sawdust sorbent via a physisorption process, meaning the process is primarily physical and preferably no chemical changes occur on the modified sawdust sorbent or organic dye. In some embodiments, the adsorption has a free energy change of −6.5 to −2.75 kJ/mol of dye adsorbed, preferably −6.25 to −3 kJ/mol of dye adsorbed, preferably −5.85 to −3.05 kJ/mol of dye adsorbed.

In some embodiments, the contaminated water has an organic dye present in an amount of 0.1 to 100,000 ppm, preferably 1 to 50,000 ppm, preferably 10 to 25,000 ppm, preferably 50 to 15,000 ppm, preferably 100 to 10,000 ppm, preferably 500 to 5,000 ppm. In some embodiments, the decontaminated water has least 25% less organic dye than that present in the water before contact with the modified sawdust sorbent, preferably at least 30% less, preferably at least 40% less, preferably at least 50% less, preferably at least 60% less, preferably at least 70% less, preferably at least 80% less, preferably at least 90% less, preferably at least 95% less, preferably at least 97.5% less, preferably at least 99% less than that present in the water before contact with the modified sawdust sorbent. In some embodiments, the modified sawdust sorbent removes 97.5 to 99% of the dye, preferably 97.6% to 98.9%, preferably 97.7% to 98.8%, preferably 97.8% to 98.7%, preferably 97.9% to 98.6%, preferably 98 to 98.5% of organic dye from the contaminated water based on an initial amount of dye present in the contaminated water. In a preferred embodiment, the decontaminated water is substantially free of the organic dye, for example, the decontaminated water contains less than 10 ppm, preferably less than 1 ppm, preferably less than 100 ppb, preferably less than 1 ppb, preferably less than 0.1 ppb, preferably less than 1 ppt of the organic dye. In a most preferred embodiment, the decontaminated water is devoid of the organic dye.

In one or more embodiments, the method of the present disclosure further involves eluting the organic dye from the modified sawdust sorbent, and reusing the modified sawdust sorbent. The eluting can be performed as described above. The modified sawdust sorbent of the present disclosure may be regenerated (i.e. eluted) and reused up to 3 cycles with a loss of no greater than 10 percent, preferably no greater than 9 percent, preferably no greater than 8 percent, preferably no greater than 7 percent, preferably no greater than 6 percent, preferably no greater than 5 percent, preferably no greater than 4 percent, preferably no greater than 3 percent, preferably no greater than 2 percent, preferably no greater than 1 percent in the organic pollutant uptake capacity, preferably up to 15 cycles, preferably up to 25 cycles, preferably up to 50 cycles, preferably up to 100 cycles, preferably up to 150 cycles, preferably up to 200 cycles, preferably up to 250 cycles, preferably up to 300 cycles, preferably up to 350 cycles, preferably up to 400 cycles, preferably up to 500 cycles, preferably up to 625 cycles, preferably up to 750 cycles, preferably up to 1,000 cycles.

In alternative embodiments, the organic dye is not eluted from the modified sawdust sorbent and the modified sawdust sorbent is not reused.

The examples below are intended to further illustrate protocols for preparing and characterizing the modified sawdust sorbent discussed above and for assessing the organic pollutant adsorption properties of said modified sawdust sorbent and are not intended to limit the scope of the claims.

Where a numerical limit or range is stated herein, the endpoints are included. Also, all values and subranges within a numerical limit or range are specifically included as if explicitly written out.

As used herein the words "a" and "an" and the like carry the meaning of "one or more."

Obviously, numerous modifications and variations of the present invention are possible in light of the above teachings. It is therefore to be understood that, within the scope of the appended claims, the invention may be practiced otherwise than as specifically described herein.

All patents and other references mentioned above are incorporated in full herein by this reference, the same as if set forth at length.

EXAMPLES

Materials and Methods

Sawdust was obtained from a nearby wood working factory and divided into two portions by weight. One part was chemically treated, while the second was kept for use in its raw form. The first part was treated with sulfuric acid in the ratio of 4:3 parts by weight. The material was kept in a vacuum oven for 24 hours at 150° C. The sulfonated material was washed thrice with distilled water to remove any unreacted acid and dried at 100° C. for 24 hours. After drying, the material was treated with 5% hydrogen peroxide in a ratio of 500 mL of hydrogen peroxide per 100 g of sulfonated material for 2 hours at 25° C. The peroxide-treated material was washed thrice with distilled water to remove any unreacted peroxide and dried at 60° C. for 12 hours. The material was finely grounded and passed through sieve ISS 600 and stored. This material was used in adsorption experiments as chemically activated sawdust. The second part of the sawdust was saturated with the distilled water and washed repeatedly to remove the typical yellow color of the sawdust caused by lignin. Subsequently, it was treated with formaldehyde for 6 hours to remove the lignin. The material was dried in a vacuum oven at 60° C. for 24 hours, and this dried material was grounded to fine powder and sieved through ISS 600. This material was used throughout as untreated sawdust adsorbent [S. P. Raghuvanshi, R. Singh, C. P. Kaushik, and A. K. Raghav, International Journal of Environmental Studies, 62, 3, 329-339, 2005]. The dye chrysoidine is a basic dye, with CAS number 532-82-1, molecular weight 248.71, color index number 11270, λmax 449 nm, and empirical formula (Hill Notation) $C_{12}H_{12}N_4 \cdot HCl$. The structural formula is shown in FIG. 1. All reagents used in the present study were of analytical reagent (AR) grade and supplied by Sigma-Aldrich.

Adsorption Studies

In order to explore the adsorption efficiency of both versions of sawdust, a series of experiments was conducted. During the experiments, $1.0 \times 10^{-4}$ kg to $1.0 \times 10^{-3}$ kg of both adsorbents were taken separately in 250 mL conical flasks sealed with parafilm, on an electric rotary shaking machine, in 100 mL aqueous solution of the dye (variable concentrations) at different temperatures and time intervals. After predetermined time intervals, the solution was analyzed for the residual concentration of dye by using a Shimadzu UV-VIS spectrophotometer at 449 nm. A similar procedure was followed for another set of flasks containing same dye concentration but without sawdust to be used as blank. All the experiments were conducted in triplicate at neutral pH. The adsorption of the dye can be described in terms of dye removal:

$$\text{dye removal (\%)} = \frac{C_0 - C_f}{C_0} \times 100 \tag{1}$$

where $C_0$ is the initial concentration and $C_f$ is the final concentration of the dye in the solution.

Adsorption Thermodynamics.

The spontaneity of the adsorption process is normally described by changes in the standard enthalpy ($\Delta H°$), Gibb's free energy)($\Delta G°$, and entropy)($\Delta S°$). Decrease in $\Delta G°$ normally indicates a spontaneous process and the opposite is true for a nonspontaneous reaction. The relations for the thermodynamic parameters are given as follows:

$$\Delta G° = -RT \ln K_a \tag{2}$$

where $K_a$ is the thermodynamic equilibrium constant.

$$K_d = \frac{C_a}{C_e} \approx K_a \tag{3}$$

where $K_d$ is the adsorption equilibrium constant and $C_a$ is the adsorbed concentration $$\Delta G° = \Delta H° - T \Delta S° \tag{4}$$

$$\ln K a = -\frac{\Delta H°}{RT} + \frac{\Delta S°}{R} \tag{5}$$

A linear relation between ln $K_a$ and inverse temperature is used to evaluate $\Delta H°$ and $\Delta S°$.

Adsorption Isotherms.

Adsorption analysis is normally performed using adsorption isotherms. Freundlich isotherm is the earliest known relationship describing the adsorption equation and is often expressed as $$q_e = K_F C_e^{1/n} \tag{6}$$

where $q_e$ is the adsorption density (mg of adsorbate per gm of adsorbent), $C_e$ is the equilibrium concentration (mg/L), $K_F$ is the Freundlich constant, and n is an exponent [H. Freundlich, Zeitschrift f'ur Physikalische Chemie, 57, 1, 385-470, 1906].

The equation can be converted in a linear form by taking the log on both sides as $$\log q_e = \log KF + \frac{1}{n} \log C_e. \tag{7}$$

A plot of log $q_e$ against log $C_e$ yields a straight line, indicating the conformation of Freundlich's isotherm for adsorption. The constants can be determined from the corresponding slope and intercept.

Langmuir isotherm is another most frequently used adsorption isotherm [I. Langmuir, Journal of the American Chemical Society, 40, 9, 1361-1384, 1918]. It is described by the following relation:

$$q_e = q_{max} \cdot \frac{bC_e}{1 + bC_e} \tag{8}$$

where $q_{max}$ is the maximum adsorption capacity and b is the Langmuir constant (L/mg).

This equation can also be converted into a straight line as $$\frac{C_e}{q_e} = \frac{1}{q_{max} b} + \frac{1}{q_{max}} C_e \tag{9}$$

A plot of $C_e/q_e$ vs $C_e$ gives a straight line. The slope and intercept gives the values of Langmuir constants. Equations (2) and (4) can be straightforward but may lead to errors. ISOT-Calc and other statistical and mathematical packages [J. L. Beltr'an, J. J. Pignatello, and M. Teixidio, Computers & Geosciences, 94, 11-17, 2016; and R. Li, B. Wen, S. Zhang, Z. Pei, and X. Shan, Journal of Environmental Sciences, 21, 4, 474-480, 2009] have been used to fit the nonlinear isotherm data. In this study, iterative Levenberg- Marquardt and nonlinear least squares was used to find the parameters. Nonlinear optimization was based on minimizing the objective function defined as $$OF = \Sigma w_i (q_{e(exp)} - q_{e(calc)})^2 \quad (10)$$

where $q_{e(exp)}$ is the experimental adsorption density, $q_{e(calc)}$ is the modeled adsorption density, and wi is the data weighing coefficient for every point (ce, qe).

The compatibility of an adsorbent-adsorbate pair can be indicated by a nondimensional parameter $R_L$. $R_L$ is called the separation parameter, and it is derived from Langmuir constant $$RL = \frac{1}{1+bC_0} \quad (11)$$

where $R_L > 1$ indicates nonfavorable combination, $0 < R_L < 1$ favors adsorption, and RL=1 is for nonlinear adsorption, whereas RL=0 shows irreversible adsorption.

Results

Physical Characteristics of the Dye are Summarized in Table 1.

TABLE 1

Physical parameters at of the chemically treated sawdust as compared to Raghuvanshi, et. al., 2005.

| Parameter | Raghuvanshi | Chemically Treated Sawdust |
|---|---|---|
| Moisture | 12.1 wt % | 5 wt % |
| pH | 6.5 | 4.5 +/− 0.5 |
| Density | 0.33 g/cm$^3$ | 0.50 g/cm$^3$ |
| Surface Area | 1.7 m$^2$/g | 2.3 m$^2$/g |

Figure 2A:
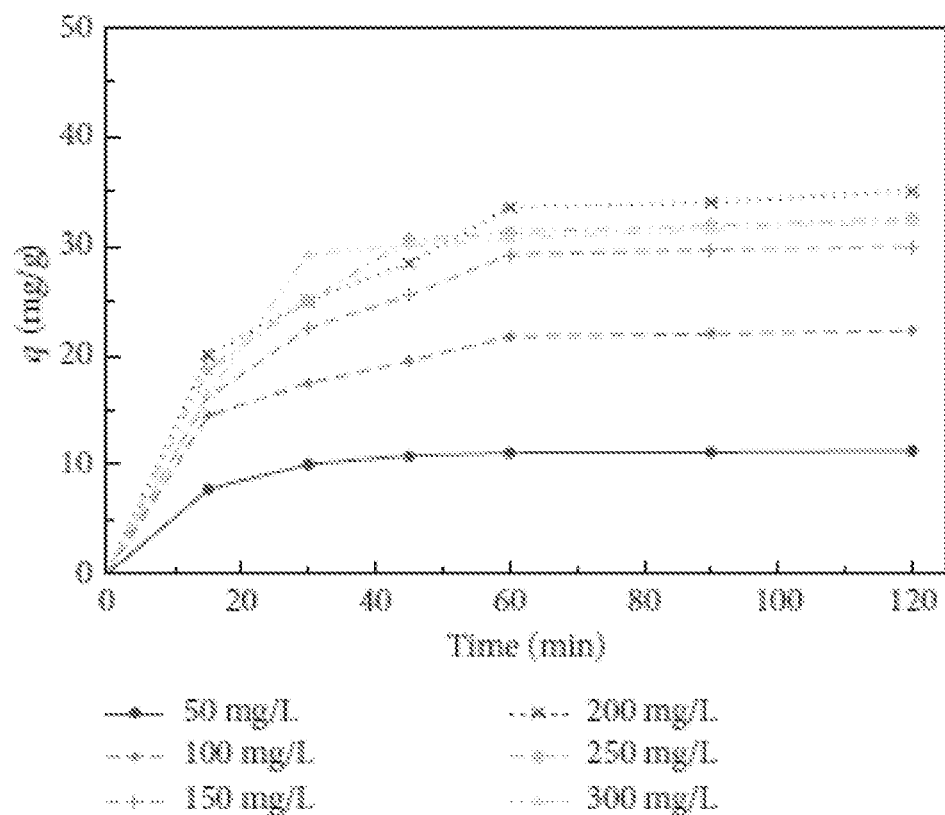
FIGS. 2A-2B show plots of dye adsorbed versus time for varying amounts of sorbent at a dye concentration of 4 g/L with FIG. 2A showing plots for raw sawdust and FIG. 2B showing plots for chemically treated sawdust.
Figure 2B:
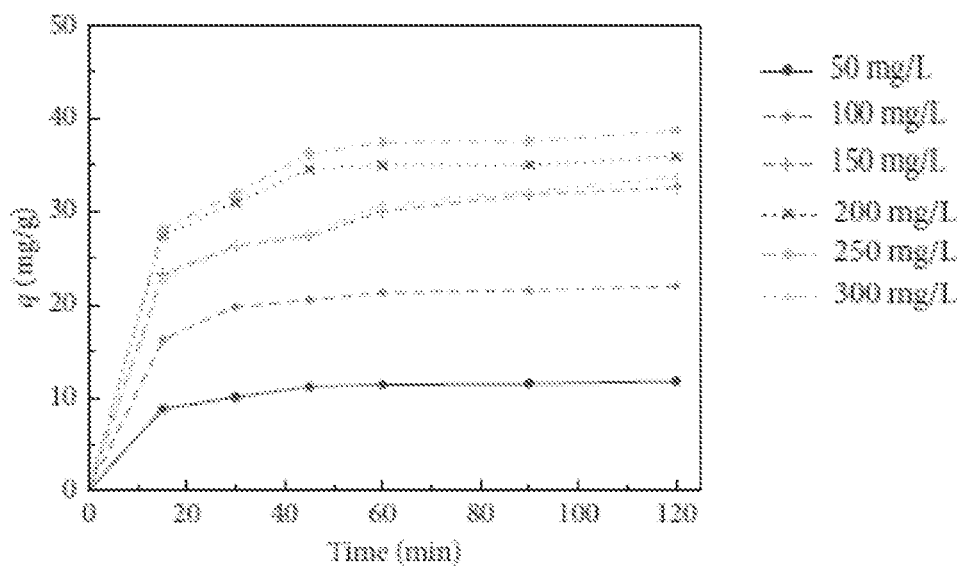

FIGS. 2A and 2B describe the effect of initial dye concentration on the rate of adsorption on sawdust both treated and untreated. It can be deduced that for any particular experiment, the rate of adsorption decreased with time until it gradually approached a plateau owing to the continuous decrease in the driving force (concentration) and also indicating that the adsorbent is saturated at this point. The saturation point was reached within 40 to 50 minutes. In the beginning, the adsorption process was found to be very fast, and a large amount of the total concentration of dye was removed in the first half an hour. Activated sawdust reached equilibrium slightly earlier than the raw sawdust. Moreover, the initial adsorption rate was high for initial dye concentration as resistance to dye uptake decreases when the mass transfer driving force increases. This observation indicated that the removal of dye is dependent upon the initial concentration of the solution.

Figure 3A:
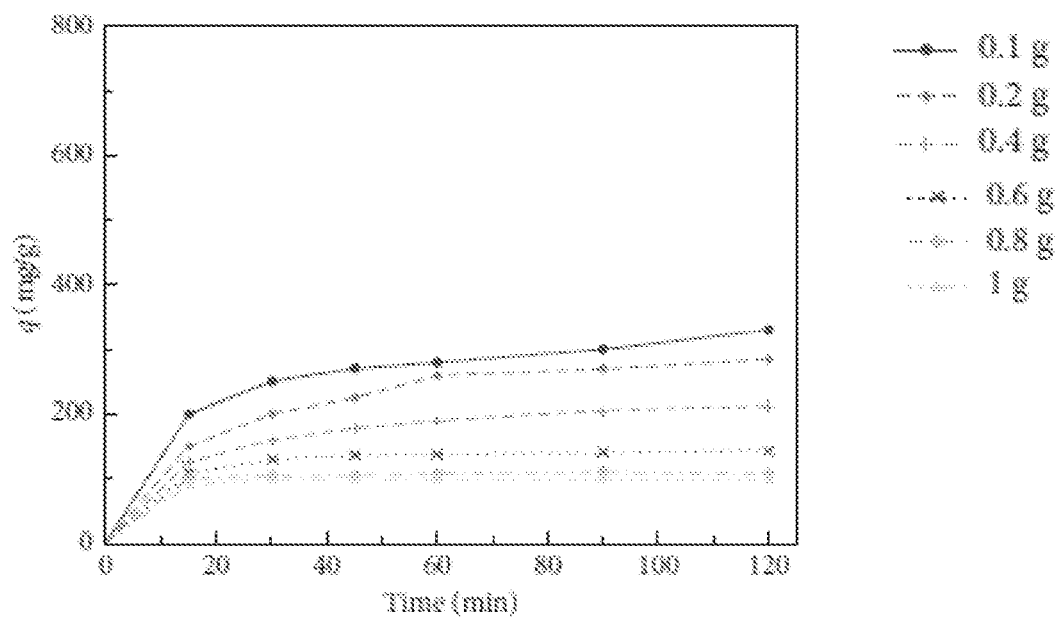
FIGS. 3A-3B show plots of dye adsorbed versus time for varying amounts of sorbent at a dye concentration of 100 mg/L with FIG. 3A showing plots for raw sawdust and FIG. 3B showing plots for chemically treated sawdust.
Figure 3B:
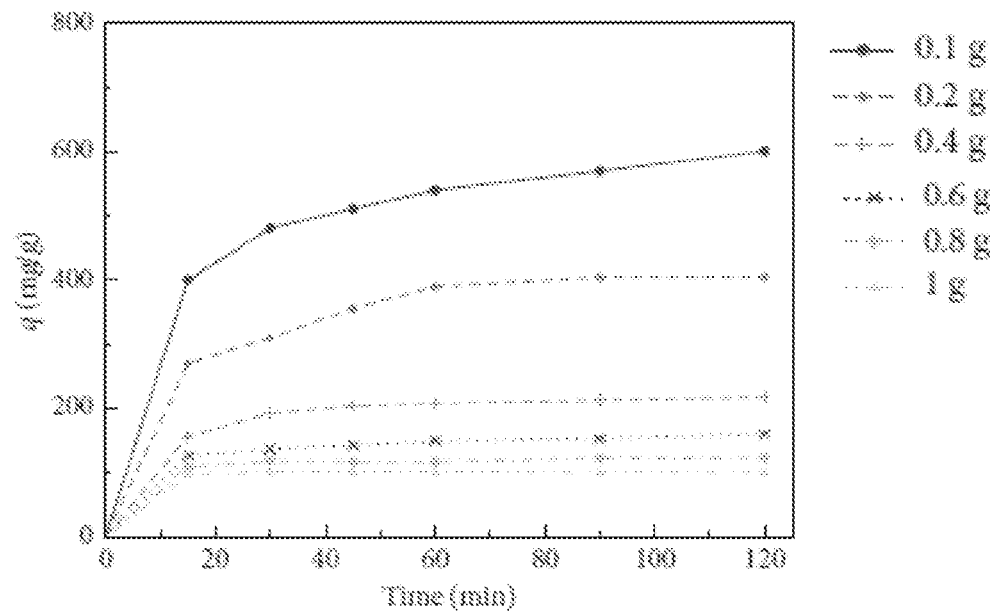

The effect of various concentrations of treated and nontreated sawdust on adsorption is shown in FIGS. 3A and 3B. Graphs show a decline in the dye concentration at a rapid pace as the sawdust quantity is increased. Chemically treated sawdust gave the greater removal at all levels of the adsorbent dose. In the beginning, the rate of dye removal was faster, which slowed down as the dose increased. This can be attributed to the fact that, at a lower adsorbent dose, the dye molecules are easily reachable, and therefore, removal per unit mass of adsorbent is higher. A larger surface area of the adsorbent particles and smaller size of adsorbate molecules favor adsorption.

The rate of adsorption is higher at the initial stage as sites are vacant for adsorption. Adsorption and desorption occur simultaneously, and an adsorption equilibrium is reached when isotherms are applied. With a rise in adsorbent quantity, there is a less corresponding increase in adsorption resulting from lower adsorptive capacity utilization of adsorbent. The results obtained from above experiment indicate that chemically treated sawdust has a large potential as an adsorbent for dye removal as compared to raw sawdust.

Figure 4A:
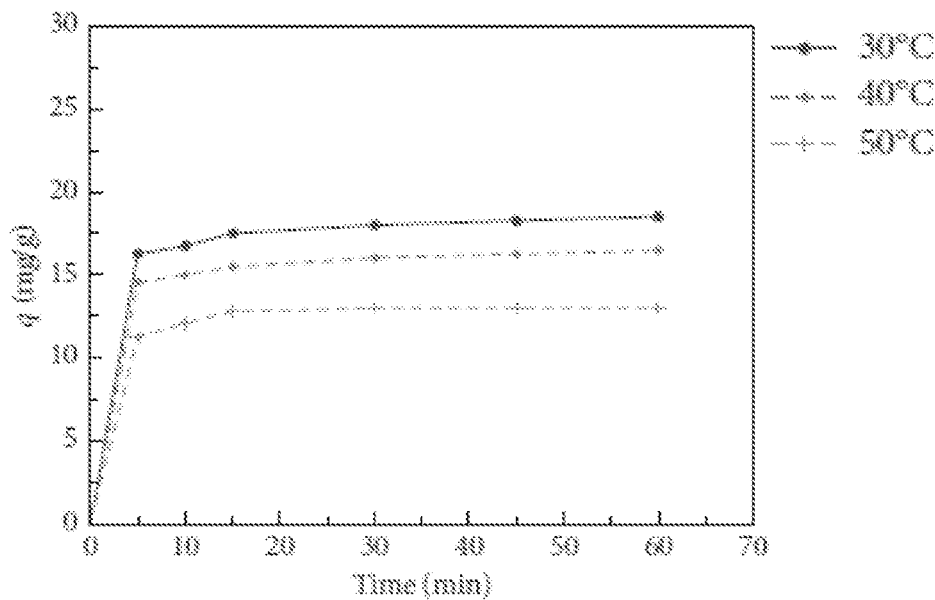
FIGS. 4A-4B show plots of dye adsorbed versus time for varying temperatures at a dye concentration of 4 g/L and a sorbent concentration of 100 mg/L with FIG. 4A showing plots for raw sawdust and FIG. 4B showing plots for chemically treated sawdust.
Figure 4B:
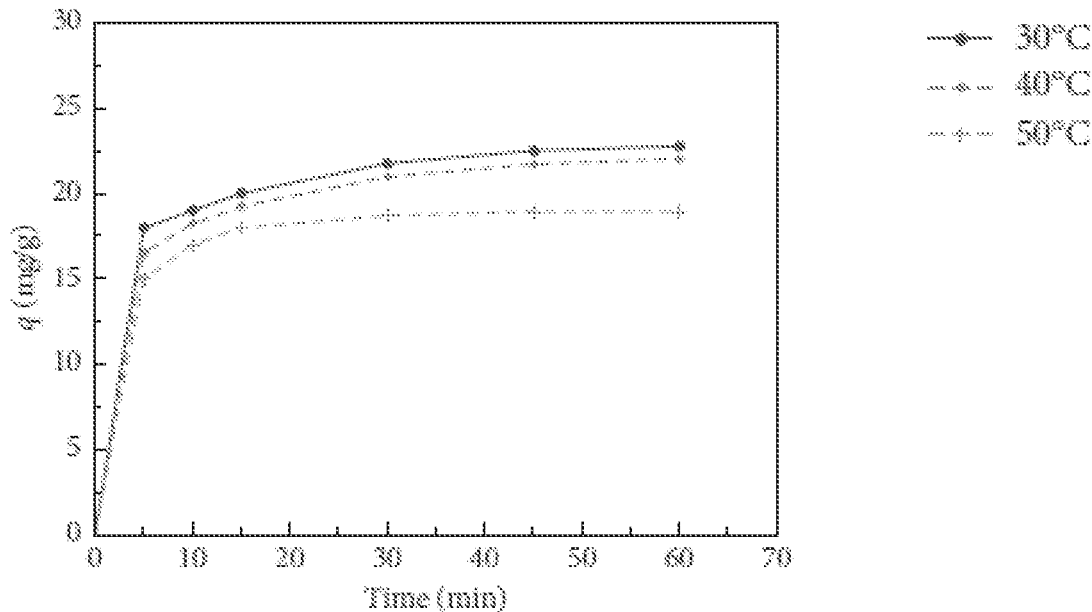

It has been reported that if the solubility of the adsorbate increases with an increase in temperature, then the chemical potential decreases and both these effects, working in the same direction, cause a decrease in adsorption. Conversely, if the temperature has the reverse effect on the solubility, then both the said effects will act in the opposite direction, and adsorption may increase or decrease depending on the predominant factor. The adsorption rates of chrysoidine at three different temperatures (30° C., 40° C., and 50° C.) were studied as shown in FIGS. 4A and 4B. In case of raw sawdust, the rate of dye adsorption decreased with an increase in temperature from 30° C. to 50° C. with a 4 g/L dose in 5 minutes time from a 100 g/L dye solution. This behavior indicated that the process is exothermic in nature. This can be attributed to the predisposition of the dye molecules to escape from the solid phase to bulk phase with a rise in temperature of the solution. However, in the case of treated sawdust, the rate of dye uptake increases rapidly.

Figure 5:
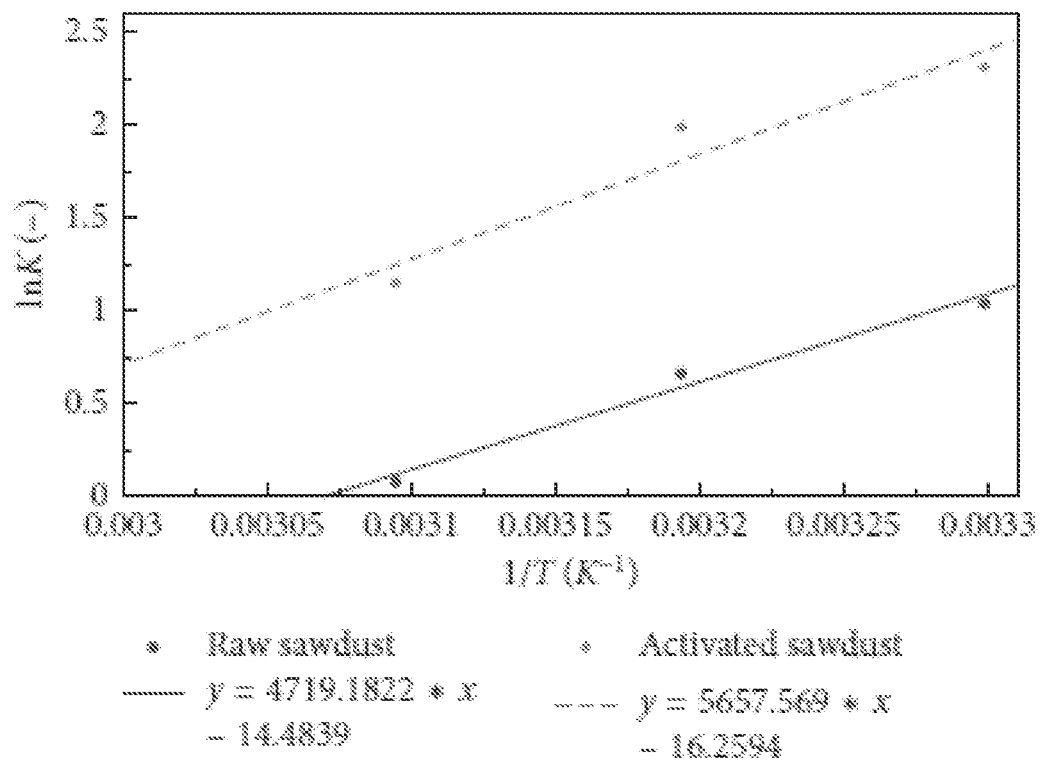
FIG. 5 is a plot of Ln K vs 1/T for raw sawdust and chemically treated sawdust where K is the equilibrium constant for the dye adsorption.

The thermodynamic parameters (H° and S°) were obtained from the slope and intercept of the linear regression line fitted on the ln K vs 1/T data. The plot for raw and activated sawdust is shown in FIG. 5, and the thermodynamic parameters values are given in Table 2.

TABLE 2

Thermodynamic parameters at different temperatures

| | Raw Sawdust | | | | Chemically Treated Sawdust | | | |
|---|---|---|---|---|---|---|---|---|
| Temp. (° C.) | $K_a$ (—) | ΔG° (kJ/mol) | ΔH° (kJ/mol) | ΔS° (J/mol · K) | $K_a$ (—) | ΔG° (kJ/mol) | ΔH° (kJ/mol) | ΔS° (J/mol · K) |
| 30 | 2.85 | −2.64 | −39.22 | −120.40 | 10.11 | −5.83 | −47.03 | −135.15 |
| 40 | 1.94 | −1.73 | | | 7.33 | −5.19 | | |
| 50 | 1.08 | −0.22 | | | 3.17 | −3.10 | | |

From Table 2, it can be seen that ΔG° is negative, indicating that the adsorption is spontaneous. With the increase in temperature, ΔG° become less negative or the spontaneity decreases by increasing temperature. Compared to raw sawdust, activated sawdust showed more negative value for ΔG°, indicating more feasibility of adsorption. ΔH° is also negative showing the process is exothermic. And the process is physisorption as chemisorption proceeds with the enthalpy changes in the range of −80 to −200 kJ/mol. The negative value of S° reveals the adsorption is ordered. Similarly, more negative value of ΔS° indicates decreasing randomness on activated surface than raw sawdust. Overall, it can be concluded from the obtained thermodynamic parameters that the activated sawdust betters in terms of feasibility, exothermicity, and ordered layering than raw sawdust.

Figure 6A:
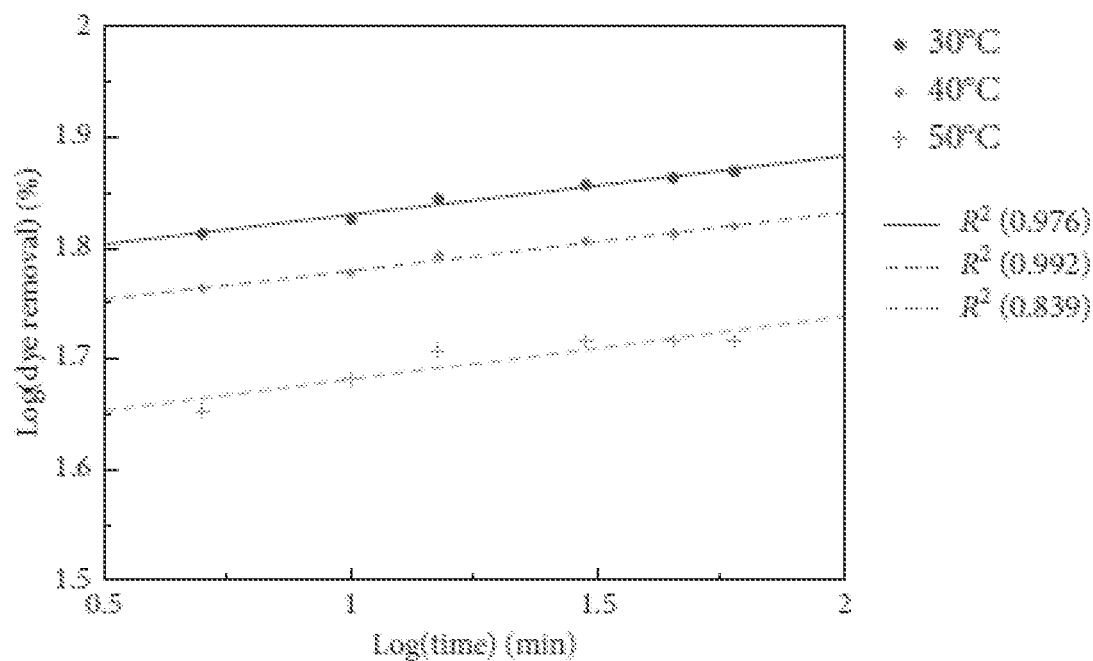
FIGS. 6A-6B show plots of the logarithm of dye removed versus the logarithm of time at different temperatures with FIG. 6A showing plots for raw sawdust and FIG. 6B showing plots for chemically treated sawdust.
Figure 6B:
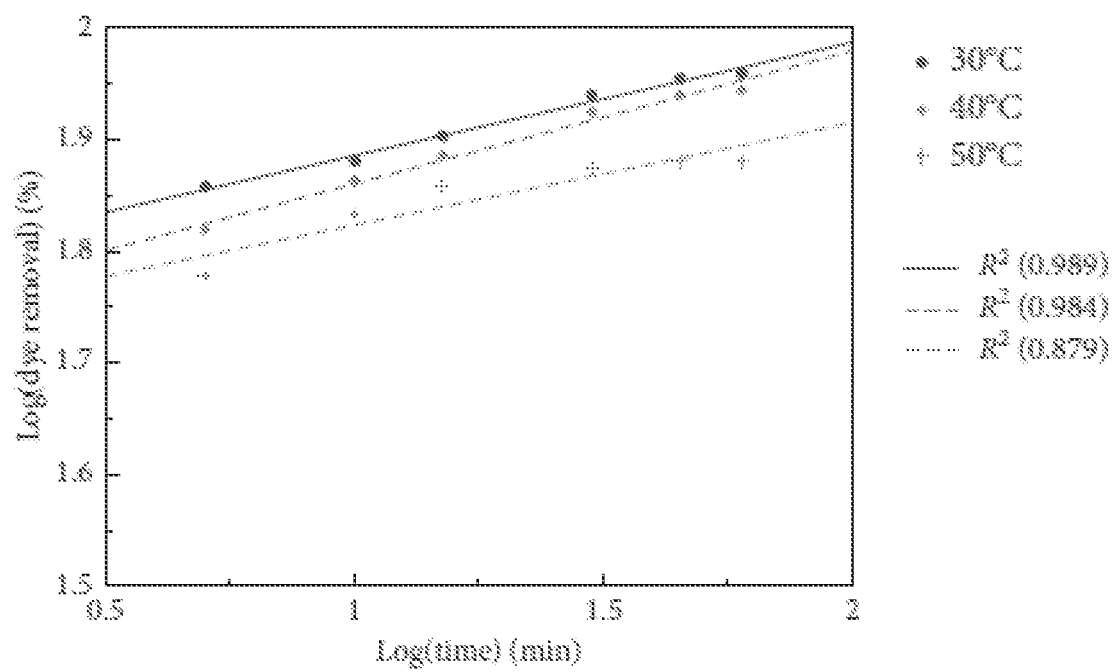

For adsorption of chrysoidine on sawdust, there may be a possibility of intraparticle diffusion. In order to investigate this possibility, experiments were conducted and are depicted in FIGS. 6A and 6B. The plots (FIGS. 6A and 6B), with log (dye removal) (%) versus log time (min), for adsorption at three different temperatures ranging between 30 and 50° C., resulted in straight lines, which specify the existence of intraparticle diffusion. These plots are used to describe whether adsorption is controlled by diffusion in the adsorbent particles or the consecutive diffusion in the bulk of the solution [G. Mckay, M. El Geundi, and M. M. Nassar, Water Research, 22, 12, 1527-1533, 1988; Y.-S. Ho, W.-T. Chiu, and C.-C. Wang, Bioresource Technology, 96, 11, 1285-1291, 2005; and A. Purai and V. K. Rattan, Carbon Letters, 11, 1, 1-8, 2010].

Adsorption Isotherms

Figure 7A:
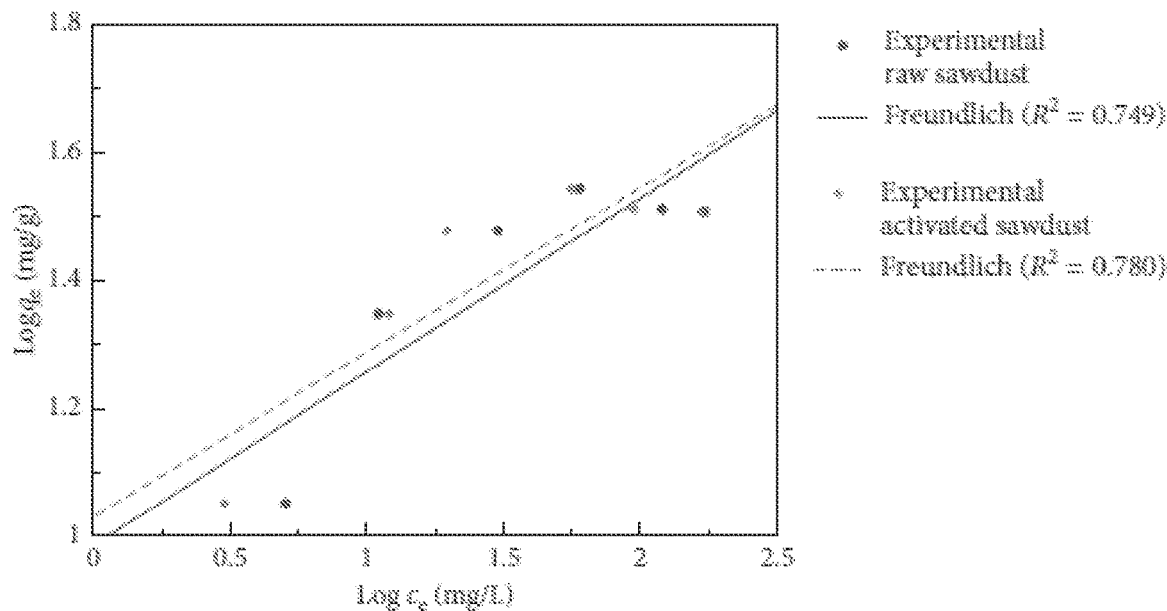
FIGS. 7A-7B show plots of Freundlich and Langmuir linear isotherms with FIG. 7A showing plots for raw sawdust and FIG. 7B showing plots for chemically treated sawdust.
Figure 7B:
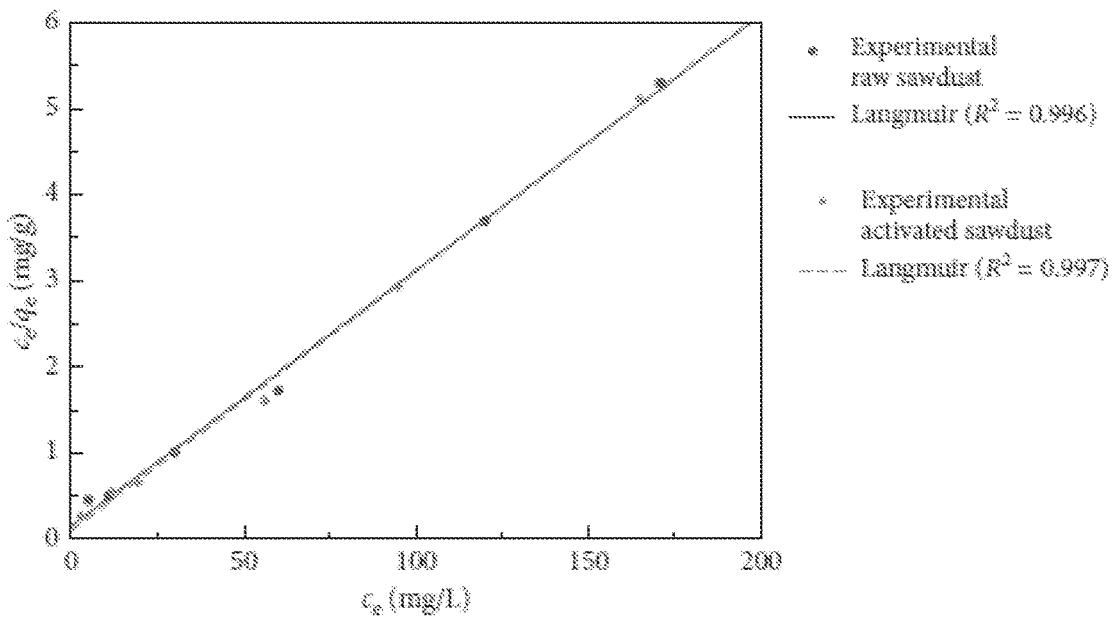

The two most frequently used adsorption isotherms are employed in FIGS. 7A and 7B for the adsorption of chrysoidine on raw and activated sawdust. It can be seen that the coefficient of determination ($R^2$) is lower in Freundlich isotherm. Therefore, it can be presumed that the adsorption of chrysoidine on raw and activated sawdust follows Langmuir adsorption model.

The parameters of the Freundlich and Langmuir linear isotherms are given in Table 3, and the same were used to compare the experimental curves. Lower values of objective function (OF) were obtained in case of Langmuir isotherm.

Figure 9:
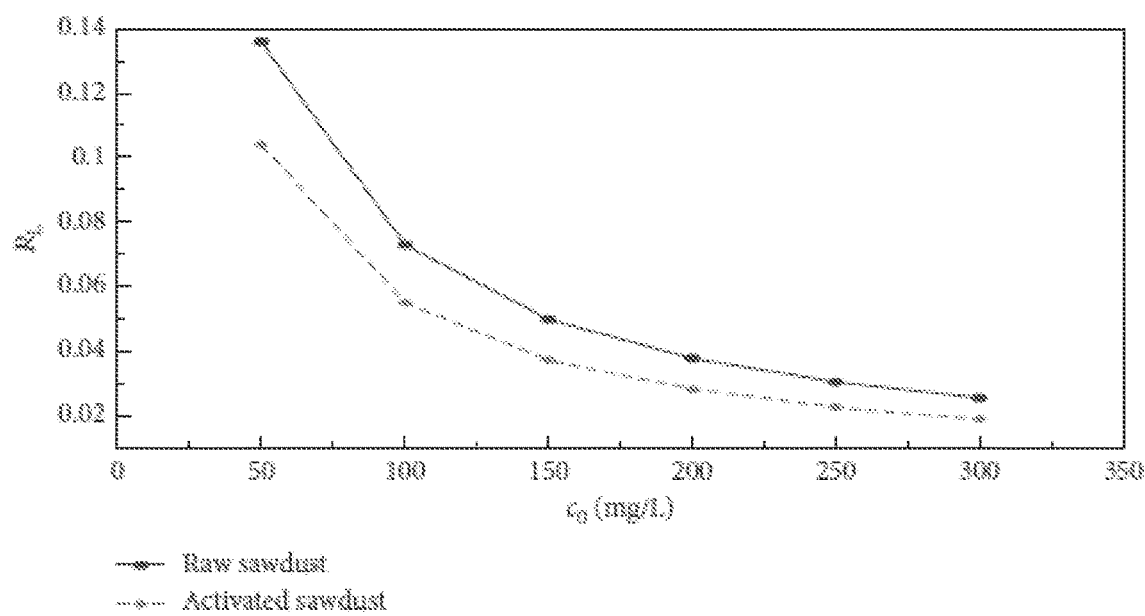
FIG. 9 shows plots of the Langmuir adsorption factor vs initial concentration of sorbent for both raw sawdust and chemically treated sawdust.

Langmuir constant "b" estimated from the nonlinear method was then used to calculate $R_L$. Evolution of $R_L$ with an initial dye concentration of raw and activated sawdust is shown in FIG. 9. $R_L$ of activated sawdust is lower (0.019 to 0.104) compared to raw sawdust (0.026 to 0.136), indicating better suitability of activated sawdust over raw sawdust for this adsorbent-adsorbate combination.

Recovery of the spent adsorbent is an important economic factor in determining the practicability of an adsorption system. However, sawdust is a wood by-product which is a waste material, available in plenty and bears no cost. Therefore, the recovery of adsorbent was not further pursued.

The invention claimed is:

1. Method for sulfonating and oxidizing sawdust to form a modified sawdust sorbent comprising:
   mixing the sawdust with sulfuric acid to form a sulfonating mixture,
   heating the sulfonating mixture at 100 to 200° C. to form a sulfonated sawdust,
   washing and drying the sulfonated sawdust at 50 to 150° C. to form a dried sawdust,
   treating the dried sawdust with a 3-5 vol % hydrogen peroxide solution in an amount of 350 to 650 mL of hydrogen peroxide solution per 100 g of dried sawdust to form a peroxide-treated sawdust,
   washing and drying the peroxide-treated sawdust at 50 to 150° C. to form a sulfonated and oxidized sawdust, and
   milling and sieving the sulfonated and oxidized sawdust to form the modified sawdust sorbent,
   wherein the modified sawdust sorbent has a dye adsorption capacity of 20 to 25 mg of dye per g of sorbent at 25 to 45° C.

2. The method of claim 1, wherein the sawdust is yellow pine sawdust.

3. The method of claim 1, wherein the sawdust is present in the sulfonating mixture in an amount of 45 to 65 wt % and

TABLE 3

Comparison of the optimized linear Freundlich and Langmuir isotherms parameters for the adsorption of chrysoidine on raw and chemically treated sawdust

| | Freundlich | | | Langmuir | | | |
|---|---|---|---|---|---|---|---|
| Sawdust | $K_F$ ($mg^{1-1/n}g^{-1}L^{1/n}$) | n | OF ($mg^2/g^2$) | $q_{max}$ | b (L/mg) | b (L/mol) | OF ($mg^2/g^2$) |
| Raw | 9.689 | 3.690 | 145.74 | 33.670 | 0.208 | 51732.51 | 51.25 |
| Activated | 10.708 | 3.887 | 146.78 | 33.333 | 0.310 | 77101.34 | 53.54 |

Figure 8A:
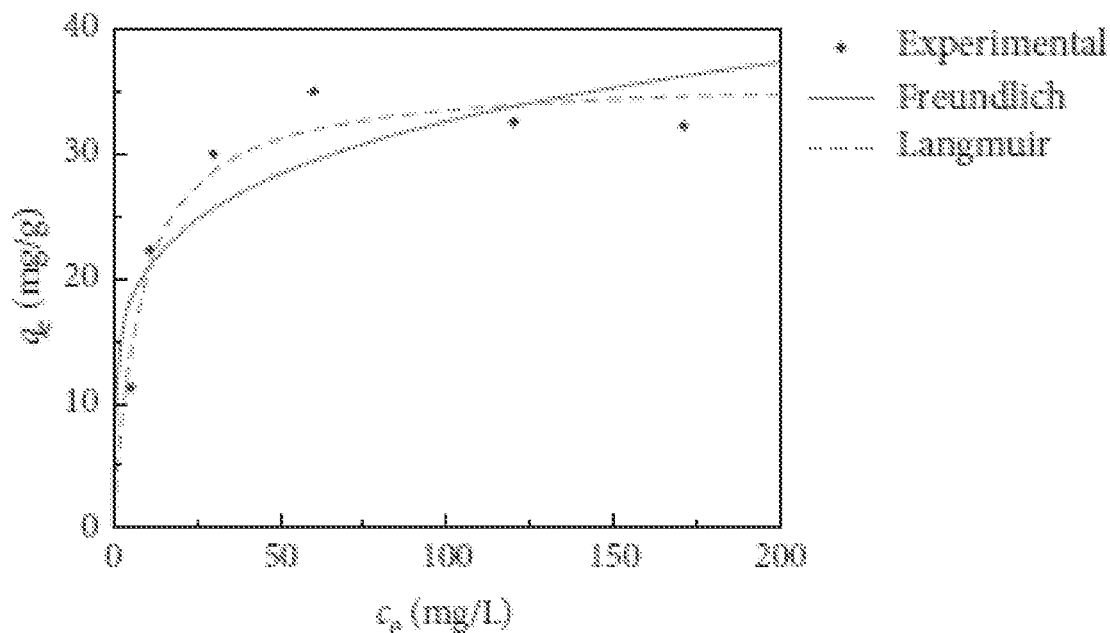
FIGS. 8A-8B show plots of Freundlich and Langmuir nonlinear isotherms with FIG. 8A showing plots for raw sawdust and FIG. 8B showing plots for chemically treated sawdust.
Figure 8B:
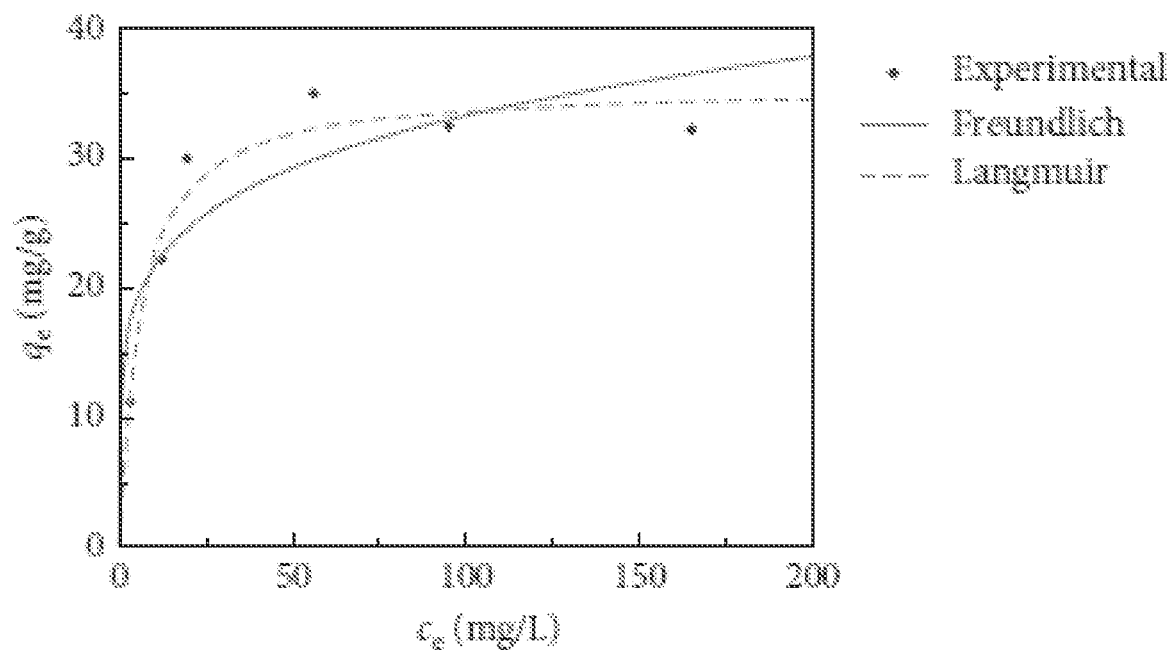

Similarly, FIGS. 8A and 8B show the nonlinear curve fittings of Freundlich and Langmuir isotherms. Lower values of OF render Langmuir better model for the adsorption of chrysoidine on raw and activated sawdust than Freundlich.

The parameters of Freundlich and Langmuir obtained from nonlinear fitting are reported in Table 4. The comparison of linear and nonlinear methods clearly reveals that the OF values are lower in case of nonlinear method.

TABLE 4

Comparison of the optimized nonlinear Freundlich and Langmuir isotherms parameters for the adsorption of chrysoidine on raw and chemically treated sawdust

| | Freundlich | | | Langmuir | | | |
|---|---|---|---|---|---|---|---|
| Sawdust | $K_F$ ($mg^{1-1/n}g^{-1}L^{1/n}$) | n | OF ($mg^2/g^2$) | $q_{max}$ | b (L/mg) | b (L/mol) | OF ($mg^2/g^2$) |
| Raw | 13.054 | 5.045 | 114.12 | 36.094 | 0.127 | 31586.68 | 27.66 |
| Activated | 14.168 | 5.387 | 111.47 | 35.603 | 0.172 | 42778.81 | 23.61 | the sulfuric acid is present in the sulfonating mixture in an amount of 35 to 55 wt %, each based on a total weight of the sulfonating mixture.

4. The method of claim 1, wherein the sulfuric acid is dilute sulfuric acid having a concentration of 0.1 to 4.2 mol/L.

5. The method of claim 1, wherein the treating is performed at ambient temperature for 1 to 3 hours.

6. The method of claim 1, wherein the sieving is performed with a sieve with 400 to 800 μm openings.

7. The method of claim 1, wherein the washing of the sulfonated sawdust and the washing of the peroxide-treated sawdust are performed with water.

8. The method of claim 1, wherein the heating of the sulfonating mixture is performed in a vacuum oven at a pressure of 0.01 to 0.25 atm.

9. The method of claim 1, where the drying of the sulfonated sawdust and the drying of the peroxide-treated sawdust are performed in a vacuum oven at a pressure of 0.01 to 0.25 atm.

10. The method of claim 1, wherein the modified sawdust sorbent has a moisture content of 0.1 to 10 wt % based on a total weight of modified sawdust sorbent, a pH of 2 to 7, a density of 0.35 to 0.65 g/cm$^3$, and a surface area of 1.75 to 2.85 m$^2$/g.

* * * * *